(12) United States Patent
Aiba et al.

(10) Patent No.: US 11,654,392 B2
(45) Date of Patent: May 23, 2023

(54) VEHICLE AND $CO_2$ RECOVERY METHOD

(71) Applicant: TOYOTA JIDOSHA KABUSHIKI KAISHA, Aichi-ken (JP)

(72) Inventors: Takao Aiba, Mitaka (JP); Hiroki Morita, Hiratsuka (JP); Tetsuya Nakahira, Susono (JP); Jun Miyagawa, Numazu (JP); Yuta Maniwa, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 360 days.

(21) Appl. No.: 17/037,683

(22) Filed: Sep. 30, 2020

(65) Prior Publication Data

US 2021/0106941 A1   Apr. 15, 2021

(30) Foreign Application Priority Data

Oct. 9, 2019 (JP) .............................. JP2019-186218

(51) Int. Cl.
*B01D 53/04* (2006.01)

(52) U.S. Cl.
CPC .... *B01D 53/0415* (2013.01); *B01D 2253/102* (2013.01); *B01D 2253/108* (2013.01); *B01D 2257/504* (2013.01); *B01D 2257/80* (2013.01); *B01D 2259/40084* (2013.01); *B01D 2259/4566* (2013.01)

(58) Field of Classification Search
CPC ..... B01D 53/0415; B01D 53/04; B01D 53/82
See application file for complete search history.

(56) References Cited

U.S. PATENT DOCUMENTS 9,180,401 B2 * 11/2015 Hamad ............. B01D 53/1475
2013/0298761 A1   11/2013 Hamad
2014/0044632 A1   2/2014 Zielinski et al.

FOREIGN PATENT DOCUMENTS

| CN | 103561847 A | 2/2014 |
| JP | H4347307 A | 12/1992 |
| JP | 2014504695 A | 2/2014 |
| JP | 2014513632 A | 6/2014 |

* cited by examiner

*Primary Examiner* — Sharon Pregler
(74) *Attorney, Agent, or Firm* — Hauptman Ham, LLP

(57) ABSTRACT

A vehicle able to recover $CO_2$ includes a $CO_2$ recovery container holding an adsorbent adsorbing $CO_2$ in gas. The vehicle is configured so that the adsorbent is taken out from the vehicle.

13 Claims, 17 Drawing Sheets

VEHICLE AND CO₂ RECOVERY METHOD

RELATED APPLICATIONS

The present application claims priority of Japanese Patent Application No. 2019-186218, filed Oct. 9, 2019, the disclosure of which is hereby incorporated by reference herein in its entirety.

FIELD

The present invention relates to a vehicle and a $CO_2$ recovery method.

BACKGROUND

Known in the past has been a vehicle equipped with an adsorbent for adsorbing $CO_2$ in its exhaust gas in order to decrease the carbon dioxide ($CO_2$) discharged from the vehicle (for example, PTL 1). However, even if an adsorbent is used to recover $CO_2$ in a vehicle, it is necessary to take out the $CO_2$ from the vehicle for suitably treating the $CO_2$ taken out.

CITATIONS LIST

Patent Literature

[PTL 1] Japanese Unexamined Patent Publication No. 2014-504695

SUMMARY

Technical Problem

In relation to this, PTL 1 describes a vehicle in which $CO_2$ is made to be desorbed from the adsorbent and the desorbed $CO_2$ is temporarily stored in the vehicle. However, in order to make $CO_2$ desorb from the adsorbent, heating, reduction of pressure, and other treatment becomes necessary. For this reason, making $CO_2$ desorb from an adsorbent in a vehicle led to the addition of the necessary equipment, increase of the power consumption, etc., so is not realistic.

Further, in order to make $CO_2$ desorb from an adsorbent in a vehicle, it may be considered to use an apparatus provided outside of the vehicle for heating, reduction of pressure, and other treatment. However, the vehicle must be made to stop for a long period of time to make the $CO_2$ desorb from the adsorbent and take out the $CO_2$ to the outside of vehicle, therefore convenience is lowered.

In consideration of the above problem, an object of the present invention is to efficiently take out $CO_2$ adsorbed at an adsorbent in a vehicle to the outside of the vehicle.

Solution to Problem

The summary of the present disclosure is as follows.

(1) A vehicle able to recover $CO_2$, comprising a $CO_2$ recovery container holding an adsorbent adsorbing $CO_2$ in gas, wherein the vehicle is configured so that the adsorbent is taken out from the vehicle.

(2) The vehicle described in above (1), further comprising a discharge passage discharging the adsorbent from the $CO_2$ recovery container to an outside of the vehicle.

(3) The vehicle described in above (2), further comprising a supply passage supplying the adsorbent from the outside of the vehicle to the $CO_2$ recovery container.

(4) The vehicle described in above (2), further comprising an adsorbent storage container storing the adsorbent before contacting gas in the $CO_2$ recovery container, and a supply passage supplying the adsorbent from the outside of the vehicle to the adsorbent storage container.

(5) The vehicle described in above (3) or (4), further comprising a fuel tank storing fuel, and a refueling path supplying fuel from the outside of the vehicle to the fuel tank, wherein the refueling path is connected to one side surface of the vehicle, and the supply passage is connected to the other side surface of the vehicle.

(6) The vehicle described in above (3) or (4), further comprising a fuel tank storing fuel, and a refueling path supplying fuel from the outside of the vehicle to the fuel tank, wherein the refueling path is connected to a side surface of the vehicle, and the supply passage is connected to a back of the vehicle.

(7) The vehicle described in above (1), wherein at least a part of the $CO_2$ recovery container can be detached from the vehicle.

(8) The vehicle described in above (2) or (7), further comprising an adsorbent storage container storing the adsorbent before contact with gas in the $CO_2$ recovery container, wherein at least a part of the adsorbent storage container being detachable from the vehicle.

(9) The vehicle described in any one of above (1) to (8), further comprising a water recovery container holding an adsorbent adsorbing water vapor in the gas, wherein the vehicle is configured so that the adsorbent adsorbing $CO_2$ in the gas and the adsorbent adsorbing water vapor in the gas are taken out from the vehicle.

(10) A $CO_2$ recovery method comprising taking out an adsorbent adsorbing $CO_2$ in gas in a vehicle from the vehicle.

(11) The $CO_2$ recovery method described in above (10), further comprising supplying a new adsorbent to the vehicle in place of the adsorbent taken out from the vehicle.

(12) The $CO_2$ recovery method described in above (10), wherein taking out the adsorbent from the vehicle includes taking out a $CO_2$ recovery container holding the adsorbent from the vehicle.

(13) The $CO_2$ recovery method described in above (12), further comprising installing a new $CO_2$ recovery container holding a new adsorbent in the vehicle in place of the $CO_2$ recovery container taken out from the vehicle.

(14) The $CO_2$ recovery method described in any one of above (10) to (13), wherein taking out the adsorbent from the vehicle includes taking out the adsorbent from the vehicle in a service station.

(15) The $CO_2$ recovery method described in any one of above (10) to (14), further comprising making $CO_2$ simultaneously desorb from adsorbents taken out from a plurality of vehicles.

(16) The $CO_2$ recovery method described in above (15), wherein making $CO_2$ simultaneously desorb from adsorbents taken out from a plurality of vehicles includes supplying gas having less than a predetermined value of concentration of $CO_2$ to the adsorbents.

(17) The $CO_2$ recovery method described in any one of above (10) to (14), further comprising supplying gas having less than a predetermined value of concentration of $CO_2$ to the adsorbent taken out from the vehicle to thereby make $CO_2$ desorb from the adsorbent.

(18) The $CO_2$ recovery method described in any one of above (10) to (14), wherein the vehicle further holds an adsorbent adsorbing $CO_2$ in the gas and an adsorbent adsorbing water vapor in the gas, and the $CO_2$ recovery method further comprises taking out the adsorbent adsorbing the water vapor in the gas in the vehicle from the vehicle.

Advantageous Effects of Invention

According to the present invention, it is possible to efficiently take out $CO_2$ adsorbed at an adsorbent in a vehicle to the outside of the vehicle.

DESCRIPTION OF EMBODIMENTS

Figure 1:
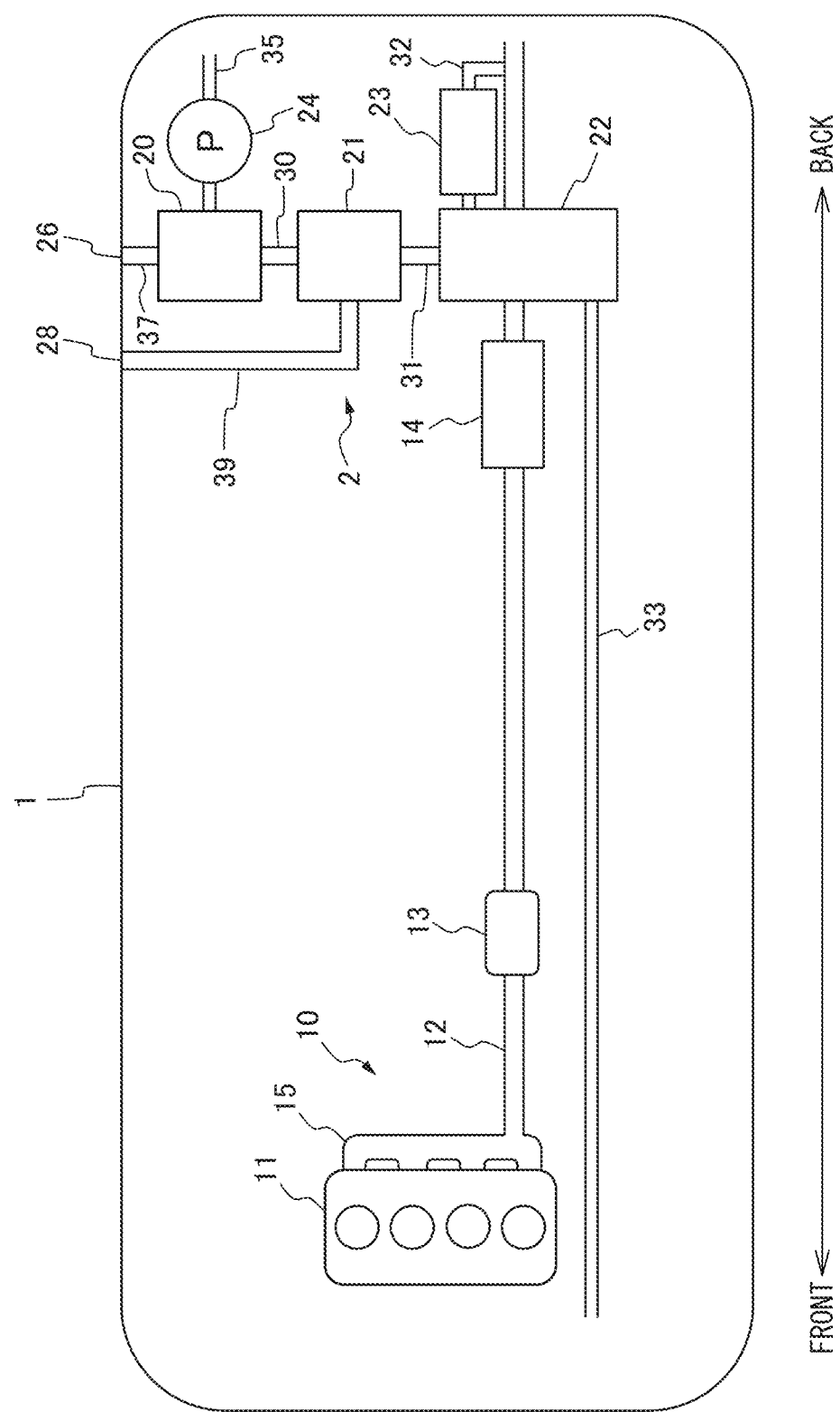
FIG. 1 is a view schematically showing a vehicle according to a first embodiment of the present invention.

Below, referring to the drawings, embodiments of the present invention will be explained in detail. Note that, in the following explanation, similar component elements will be assigned the same reference notations.

First Embodiment

First, referring to FIG. 1 to FIG. 4, a first embodiment of the present invention will be explained.

FIG. 1 is a view schematically showing a vehicle 1 according to the first embodiment of the present invention. The vehicle 1 is provided with an internal combustion engine 10 outputting power for driving the vehicle 1, and a $CO_2$ recovery system 2 recovering carbon dioxide ($CO_2$). That is, the vehicle 1 is a vehicle able to recover $CO_2$.

The internal combustion engine 10 is provided with an engine body 11, an exhaust pipe 12, an exhaust purification device 13, and a muffler 14. The engine body 11 is arranged inside an engine compartment formed at a front of the vehicle 1. The exhaust pipe 12 mainly extends below the underbody of the vehicle 1 in the front-back direction of the vehicle 1 from the engine body 11 toward the back of the vehicle 1. The exhaust purification device 13 and muffler 14 are provided in the exhaust pipe 12.

The engine body 11 burns an air-fuel mixture of air and fuel inside of it to thereby generate power for driving the vehicle 1. The exhaust gas discharged from the engine body 11 due to combustion of the air-fuel mixture flows into the exhaust pipe 12.

The exhaust pipe 12 is connected through an exhaust manifold 15 to the engine body 11. The exhaust gas discharged from the engine body 11 flows through the inside. Exhaust gas is released into the atmosphere from the outlet of the exhaust pipe 12. The exhaust pipe 12 forms an exhaust passage through which the exhaust gas discharged from the engine body 11 flows.

The exhaust purification device 13 removes the $NO_X$, HC (hydrocarbons), CO, particulate, and other substances in the exhaust gas flowing into the exhaust purification device 13. The exhaust purification device 13 is, for example, a three-way catalyst, a $NO_X$ storage and reduction catalyst, a particulate filter, etc. Note that, a plurality of exhaust purification devices 13 may be provided in the exhaust pipe 12.

The muffler 14 lowers the temperature and pressure of the exhaust gas flowing through the inside of the exhaust pipe 12 to decrease the exhaust noise. The muffler 14 is arranged at the downstream side of the exhaust purification device 13 in the direction of flow of exhaust gas. Note that, a plurality of mufflers 14 may be provided in the exhaust pipe 12.

The $CO_2$ recovery system 2 is provided with a $CO_2$ recovery container 20, a water recovery container 21, a flow path switching device 22, a cooling device 23, and a suction pump 24. In the present embodiment, the $CO_2$ recovery system 2 recovers $CO_2$ in the exhaust gas discharged from the internal combustion engine 10 and the $CO_2$ in the atmosphere outside of the vehicle.

The $CO_2$ recovery container 20 holds an adsorbent adsorbing $CO_2$ in the gas and recovers the $CO_2$ in the gas supplied to the $CO_2$ recovery container 20 (exhaust gas and atmosphere). In the present embodiment, the $CO_2$ recovery container 20 is arranged inside or below a luggage space positioned at the back of the vehicle 1.

In the present embodiment, the physical adsorption method is used as the method of recovery of $CO_2$ in the $CO_2$ recovery container 20, and as the adsorbent held in the $CO_2$ recovery container 20, a solid adsorbent (for example, zeolite, activated carbon, etc.) is used. In the physical adsorption method, $CO_2$ is adsorbed on the adsorbent by contacting a gas containing $CO_2$ with the adsorbent, and the $CO_2$ is desorbed from the adsorbent by heading the adsorbent or reducing the pressure around the adsorbent.

A solid adsorbent such as zeolite tends to preferentially adsorb water vapor in a gas compared with the $CO_2$ in the gas. For this reason, if the gas flowing into the $CO_2$ recovery container 20 contains a large amount of water vapor, the adsorption efficiency of $CO_2$ at the $CO_2$ recovery container 20 falls. Therefore, in the present embodiment, the water vapor in the gas flowing into the $CO_2$ recovery container 20 is recovered at the water recovery container 21.

The water recovery container 21 holds an adsorbent adsorbing the water vapor in the gas and recovers the water vapor in the gas supplied to the water recovery container 21 (exhaust gas and atmosphere). Therefore, the vehicle 1 holds an adsorbent adsorbing $CO_2$ in the gas and an adsorbent adsorbing water vapor in the gas. In the present embodiment, the water recovery container 21 is arranged inside or below the luggage space positioned at the back of the vehicle and is arranged so as to adjoin the $CO_2$ recovery container 20. Further, the water recovery container 21 is arranged at an upstream side of the $CO_2$ recovery container 20 in the direction of flow of gas and is connected to the $CO_2$ recovery container 20 through the first gas flow path 30. The first gas flow path 30 is communicated with the water recovery container 21 at the upstream side end part and is communicated with the $CO_2$ recovery container 21 at the downstream side end part. Therefore, the gas flowing out from the water recovery container 21 flows into the $CO_2$ recovery container 20 through the first gas flow path 30.

In the present embodiment, the physical adsorption method is used as the method of recovery of water vapor in the water recovery container 21, and as the adsorbent held in the water recovery container 21, a solid adsorbent (for example, zeolite, activated carbon, etc.) is used. Note that, the adsorbent held in the water recovery container 21 may be the same as or different from the adsorbent held in the $CO_2$ recovery container 20. If different adsorbents are used, an adsorbent with a relatively high performance in adsorbing water vapor and a relatively low performance in adsorbing $CO_2$ is held in the water recovery container 21, while an adsorbent with a relatively low performance in adsorbing water vapor and a relatively high performance in adsorbing $CO_2$ is held in the $CO_2$ recovery container 20.

The flow path switching device 22 is configured to be able to switch the type of gas flowing into the water recovery container 21 and the $CO_2$ recovery container 20. In the present embodiment, the flow path switching device 22 is arranged inside or below the luggage space positioned at the back of the vehicle 1 and is arranged so as to adjoin the water recovery container 21. The exhaust pipe 12 extends below the flow path switching device 22 toward the back of the vehicle 1 and communicates with the outside of the vehicle 1.

The flow path switching device 22 is arranged at the upstream side of the $CO_2$ recovery container 20 and the water recovery container 21 in the direction of flow of gas and is connected to the water recovery container 21 through a second gas flow path 31. The second gas flow path 31 is communicated with the flow path switching device 22 at the upstream side end part and is communicated with the water recovery container 21 at the downstream side end part. Therefore, the gas flowing out from the flow path switching device 22 flows into the water recovery container 21 through the second gas flow path 31.

Further, the flow path switching device 22 is connected with the exhaust pipe 12 through an exhaust pipe connection passage 32. In other words, the exhaust pipe connection passage 32 connects the exhaust pipe 12 and the flow path switching device 22. The exhaust pipe connection passage 32 is configured so that the exhaust gas flows from the exhaust pipe 12 to the flow path switching device 22. For this reason, the exhaust pipe connection passage 32 is communicated with the exhaust pipe 12 at one end part and is communicated with the flow path switching device 22 at the other end part. Further, the exhaust pipe connection passage 32 is connected to the exhaust pipe 12 at the downstream side from the muffler 14 in the direction of flow of exhaust gas. For this reason, relatively low temperature exhaust gas flows into the exhaust pipe connection passage 32.

Note that, as long as exhaust gas discharged from the engine body 11 can flow into the flow path switching device 22 through the exhaust pipe connection passage 32, the exhaust pipe connection passage 32 may be configured in any way. For example, the exhaust pipe connection passage 32 may be connected to the exhaust pipe 12 at any position at the upstream side from the muffler 14.

Further, the flow path switching device 22 is connected to the front part of the vehicle 1 through an atmospheric connection passage 33. In other words, the atmospheric connection passage 33 connects the front of the vehicle 1 and the flow path switching device 22. In the present embodiment, the atmospheric connection passage 33 extends below the underbody of the vehicle 1 in the front-back direction from the flow path switching device 22 toward the front of the vehicle 1.

The atmospheric connection passage 33 is configured so that the atmosphere at the outside of the vehicle 1 flows into the flow path switching device 22. For this reason, the atmospheric connection passage 33 is communicated with the engine compartment of the vehicle 1 at one end part and is communicated with the flow path switching device 22 at the other end part.

Note that, as long as the atmosphere at the outside of the vehicle 1 can flow through the atmospheric connection passage 33 into the flow path switching device 22, the atmospheric connection passage 33 may be configured in any way. For example, the atmospheric connection passage 33 may be connected to the side surface or the bottom surface of the vehicle 1 and communicated with the outside of the vehicle 1 at one end part. Further, the atmospheric connection passage 33 may be connected to the back of the vehicle and communicated with the luggage space of the vehicle 1 at one end part.

In the present embodiment, the flow path switching device 22 is configured to change the ratio (0:1 to 1:0) of the gas flowing from the exhaust pipe connection passage 32 (exhaust gas) into the second gas flow path 31 (that is, the water recovery container 21 and $CO_2$ recovery container 20) and the gas flowing from the atmospheric connection passage 33 (atmosphere) into the second gas flow path 31. In this case, the flow path switching device 22 is, for example, configured as a first solenoid valve changing the opening area of the exhaust pipe connection passage 32 and a second solenoid valve changing the opening area of the atmospheric connection passage 33. Note that, the flow path switching device 22 may be configured so as to switch the passage communicated with the second gas flow path 31 between the exhaust pipe connection passage 32 and the atmospheric connection passage 33. In this case, the flow path switching device 22 is for example configured as a three-way valve.

The suction pump 24 is provided with a gas outflow path 35 connected to the $CO_2$ recovery container 20. The gas outflow path 35 is configured to discharge the gas from which $CO_2$ is recovered at the $CO_2$ recovery container 20 to the atmosphere. For this reason, the gas outflow path 35 is communicated with the $CO_2$ recovery container 20 at the upstream side end part and is communicated with the outside of the vehicle 1 at the downstream side end part.

The suction pump 24 is configured so as to suck out the gas from the water recovery container 21 and the $CO_2$ recovery container 20. That is, the suction pump 24 is configured so as to forcibly send gas from the exhaust pipe 12 and the outside of the vehicle 1 through the flow path switching device 22 to the water recovery container 21 and the $CO_2$ recovery container 20. Further, the output of the suction pump 24 can be changed. If the output of the suction pump 24 becomes larger, the flow rate of gas flowing into the water recovery container 21 and $CO_2$ recovery container 20 becomes greater.

The cooling device 23 is provided at the exhaust pipe connection passage 32 and cools the exhaust gas flowing through the inside of the exhaust pipe connection passage 32. Due to this, it is possible to lower the temperature of the exhaust gas flowing into the water recovery container 21 and the $CO_2$ recovery container 20 and possible to raise the efficiency of adsorption of water vapor at the water recovery container 21 and the efficiency of adsorption of $CO_2$ at the $CO_2$ recovery container 20.

The cooling device 23 is, for example, configured as a refrigeration circuit provided with a compressor, a condenser, an expansion valve, and an evaporator. In the cooling device 23, a refrigeration cycle is realized by refrigerant circulating through the component parts. In particular, the evaporator exchanges heat with the exhaust gas flowing through the exhaust pipe connection passage 32 either directly or indirectly through a medium and cools this exhaust gas. Since the refrigerant in the refrigeration circuit falls to a temperature lower than the temperature of the atmosphere, in the present embodiment, the cooling device 23 can make the temperature of the exhaust gas flowing into the water recovery container 21 and $CO_2$ recovery container 20 fall to a temperature lower than the temperature of the atmosphere (ordinary temperature).

Note that, the cooling device 23 does not necessarily be configured as a refrigeration circuit. The cooling device 23 may be configured in any way as long as cooling the exhaust gas flowing through the exhaust pipe connection passage 32. For example, the cooling device 23 may be provided with a radiator of the vehicle 1 and be configured so as to use the coolant cooled at the radiator to cool the exhaust gas flowing through the exhaust pipe connection passage 32.

Further, in the present embodiment, the cooling device 23 is provided at the exhaust pipe connection passage 32. However, the cooling device 23 may be provided at the second gas flow path 31. In this case, the cooling device 23 can cool not only exhaust gas flowing through the exhaust pipe connection passage 32 but also all of the gas flowing into the water recovery container 21 and the $CO_2$ recovery container 20. Furthermore, the cooling device 23 may be arranged around the water recovery container 21 and the $CO_2$ recovery container 20 and configured so as to cool the water recovery container 21 and the $CO_2$ recovery container 20.

Figure 2:
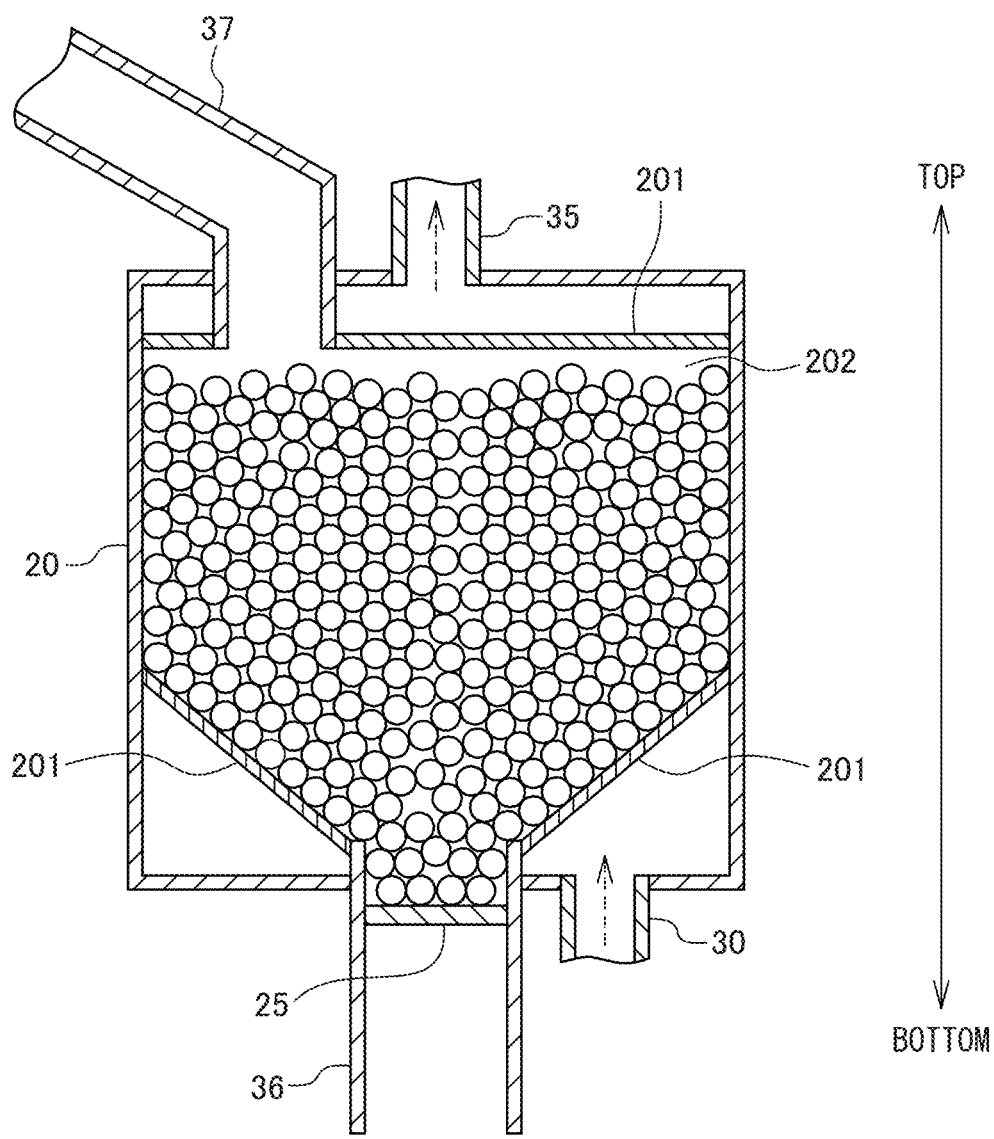
FIG. 2 is a schematic cross-sectional view of the $CO_2$ recovery container in FIG. 1.

Below, the $CO_2$ recovery container 20 will be explained in more detail. FIG. 2 is a schematic cross-sectional view of the $CO_2$ recovery container 20 in FIG. 1. In the present embodiment, the $CO_2$ recovery container 20 has a substantially columnar shape and holds bead shaped solid adsorbent (for example zeolite).

The $CO_2$ recovery container 20 has a first partition 201 defining a first holding space 202 holding the adsorbent. The first partition 201 is provided at the inside of the $CO_2$ recovery container 20 and is configured to permit passage of gas and prohibit passage of adsorbent. For example, the first partition 201 is formed with a large number of holes having pore sizes smaller than the diameter of single particle of adsorbent. Further, the first partition 201 may be configured as a gas permeable membrane passing gas and not passing a solid.

The $CO_2$ recovery container 20 is connected to the first gas flow path 30 at the upstream side in the direction of flow of gas and is connected to the gas outflow path 35 at the downstream side in the direction of flow of gas. In the present embodiment, the first gas flow path 30 is connected to the bottom part of the $CO_2$ recovery container 20, while the gas outflow path 35 is connected to the top part of the $CO_2$ recovery container 20. For this reason, if the suction pump 24 provided at the gas outflow path 35 is operated, the gas flowing into the $CO_2$ recovery container 20 moves upward in the vertical direction in the $CO_2$ recovery container 20. At this time, the gas passing through the lower side first partition 201 contacts the adsorbent at the first holding space 202 and the adsorbent adsorbs the $CO_2$ in the gas. The gas from which $CO_2$ is recovered runs from the first holding space 202 through the upper side first partition 201 and is discharged to the gas outflow path 35. FIG. 2 shows the direction of flow of gas flowing into the $CO_2$ recovery container 20 by the broken line arrow.

Further, the vehicle 1 is provided with a first discharge passage 36, first opening and closing mechanism 25, and first supply passage 37. The first discharge passage 36 connects the $CO_2$ recovery container 20 and the outside of the vehicle 1 and discharges adsorbent from the $CO_2$ recovery container 20 to the outside of the vehicle 1. The first discharge passage 36 is communicated with the first holding space 202 of the $CO_2$ recovery container 20 at one end part and is communicated with the outside of the vehicle 1 at the other end part. The first discharge passage 36 extends downward from the $CO_2$ recovery container 20 toward the bottom surface of the vehicle 1.

The first opening and closing mechanism 25 is provided at the first discharge passage 36 and is configured so as to open and close the first discharge passage 36. For example, the first opening and closing mechanism 25 has a moving part moving linearly so as to open and close the first discharge passage 36, and a drive part driving the moving part (for example a solenoid). Note that, the first opening and closing mechanism 25 may have a moving part rotating by equal to or greater than 90 degrees so as to open and close the first discharge passage 36 and a drive part driving the moving part (for example a motor). Further, the first opening and closing mechanism 25 may be configured as a solenoid valve opening and closing the first discharge passage 36.

As shown in FIG. 1, the first supply passage 37 connects the outside of the vehicle 1 and the $CO_2$ recovery container 20 and supplies adsorbent from the outside of the vehicle 1 to the $CO_2$ recovery container 20. The first supply passage 37 is communicated with the outside of the vehicle 1 through the first supply port 26 at one end part and is communicated with the first holding space 202 of the $CO_2$ recovery container 20 at the other end part. The first supply passage 37 extends upward at a slant from the first holding space 202 to the first supply port 26. In the present embodiment, the first supply port 26 is arranged at the side surface of the vehicle 1.

As shown in FIG. 2, the lower side first partition 201 is connected to the first discharge passage 36 and extends downward at a slant toward the first discharge passage 36. When the first opening and closing mechanism 25 closes the first discharge passage 36, the adsorbent is supported by the first partition 201 and the first opening and closing mechanism 25 and is held at the first holding space 202. On the other hand, if the first opening and closing mechanism 25 opens the first discharge passage 36, the adsorbent is discharged by gravity from the first holding space 202 through the first discharge passage 36 to the outside of the vehicle 1. Therefore, the vehicle 1 is configured so that the adsorbent inside the $CO_2$ recovery container 20 is taken out from the vehicle 1.

Figure 3:
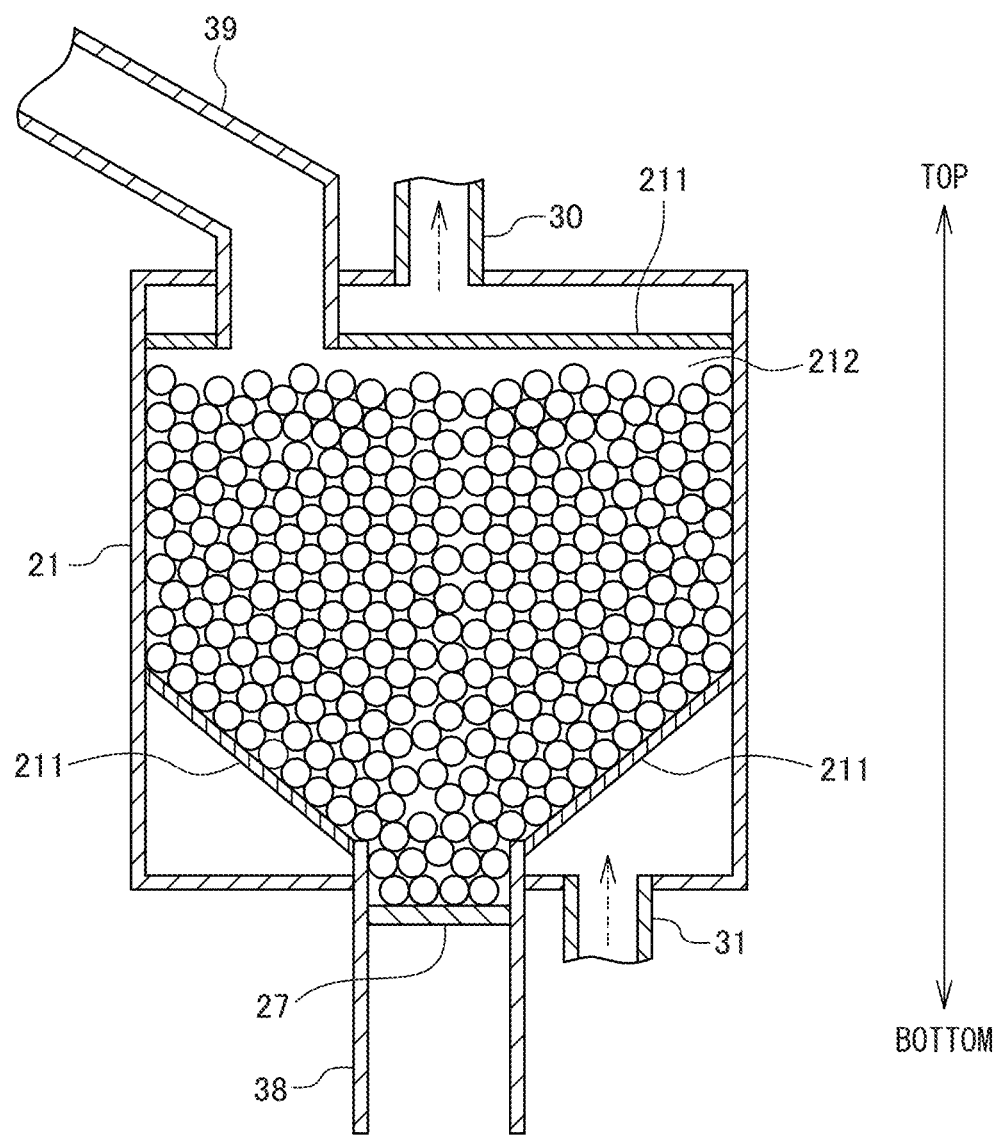
FIG. 3 is a schematic cross-sectional view of the water recovery container in FIG. 1.

Below, the water recovery container 21 will be explained in greater detail. FIG. 3 is a schematic cross-sectional view of the water recovery container 21 in FIG. 1. In the present embodiment, the water recovery container 21 has a substantially columnar shape and holds bead shaped solid adsorbent (for example zeolite).

The water recovery container 21 has a second partition 211 defining a second holding space 212 holding the adsorbent. The second partition 211 has a configuration similar to the first partition 201 and functions in the same way as the first partition 201.

The water recovery container 21 is connected to the second gas flow path 31 at the upstream side in the direction of flow of gas and is connected to the first gas flow path 30 at the downstream side in the direction of flow of gas. In the present embodiment, the second gas flow path 31 is connected to the bottom part of the water recovery container 21, while the first gas flow path 30 is connected to the top part of the water recovery container 21. For this reason, if the suction pump 24 provided at the gas outflow path 35 is operated, the gas flowing into the water recovery container 21 moves upward in the vertical direction in the water recovery container 21. At this time, the gas passing through the lower side second partition 211 contacts the adsorbent at the second holding space 212 and the adsorbent adsorbs the water vapor in the gas. The gas from which the water vapor is recovered runs from the second holding space 212 through the upper side second partition 211 and is discharged to the first gas flow path 30. FIG. 3 shows the direction of flow of gas flowing into the water recovery container 21 by the broken line arrow.

Further, the vehicle 1 is provided with a second discharge passage 38, a second opening and closing mechanism 27, and a second supply passage 39. The second discharge passage 38 connects the water recovery container 21 and the outside of the vehicle 1 and discharges the adsorbent from the water recovery container 21 to the outside of the vehicle 1. The second discharge passage 38 is communicated with the second holding space 212 of the water recovery container 21 at one end part and is communicated with the outside of the vehicle 1 at the other end part. The second discharge passage 38 extends downward from the water recovery container 21 toward the bottom surface of the vehicle 1.

The second opening and closing mechanism 27 is provided at the second discharge passage 38 and is configured so as to open and close the second discharge passage 38. The second opening and closing mechanism 27 is configured in the same way as the first opening and closing mechanism 25 and functions in the same way as the first opening and closing mechanism 25.

As shown in FIG. 1, the second supply passage 39 connects the outside of the vehicle 1 and the water recovery container 21 and supplies adsorbent from the outside of the vehicle 1 to the water recovery container 21. The second supply passage 39 is communicated with the outside of the vehicle 1 through the second supply port 28 at one end part and is communicated with the second holding space 212 of the water recovery container 21 at the other end part. The second supply passage 39 extends upward at a slant from the second holding space 212 toward the second supply port 28. In the present embodiment, the second supply port 28 is arranged at the side surface of the vehicle 1 and is arranged so as to adjoin the first supply port 26.

As shown in FIG. 3, the lower side second partition 211 is connected to the second discharge passage 38 and extends downward at a slant toward the second discharge passage 38. When the second opening and closing mechanism 27 closes the second discharge passage 38, the adsorbent is supported by the second partition 211 and the second opening and closing mechanism 27 and is held in the second holding space 212. On the other hand, if the second opening and closing mechanism 27 opens the second discharge passage 38, the adsorbent is discharged by gravity from the second holding space 212 through the second discharge passage 38 to the outside of the vehicle 1. Therefore, the vehicle 1 is configured so that the adsorbent inside the water recovery container 21 is taken out from the vehicle 1.

Figure 4:
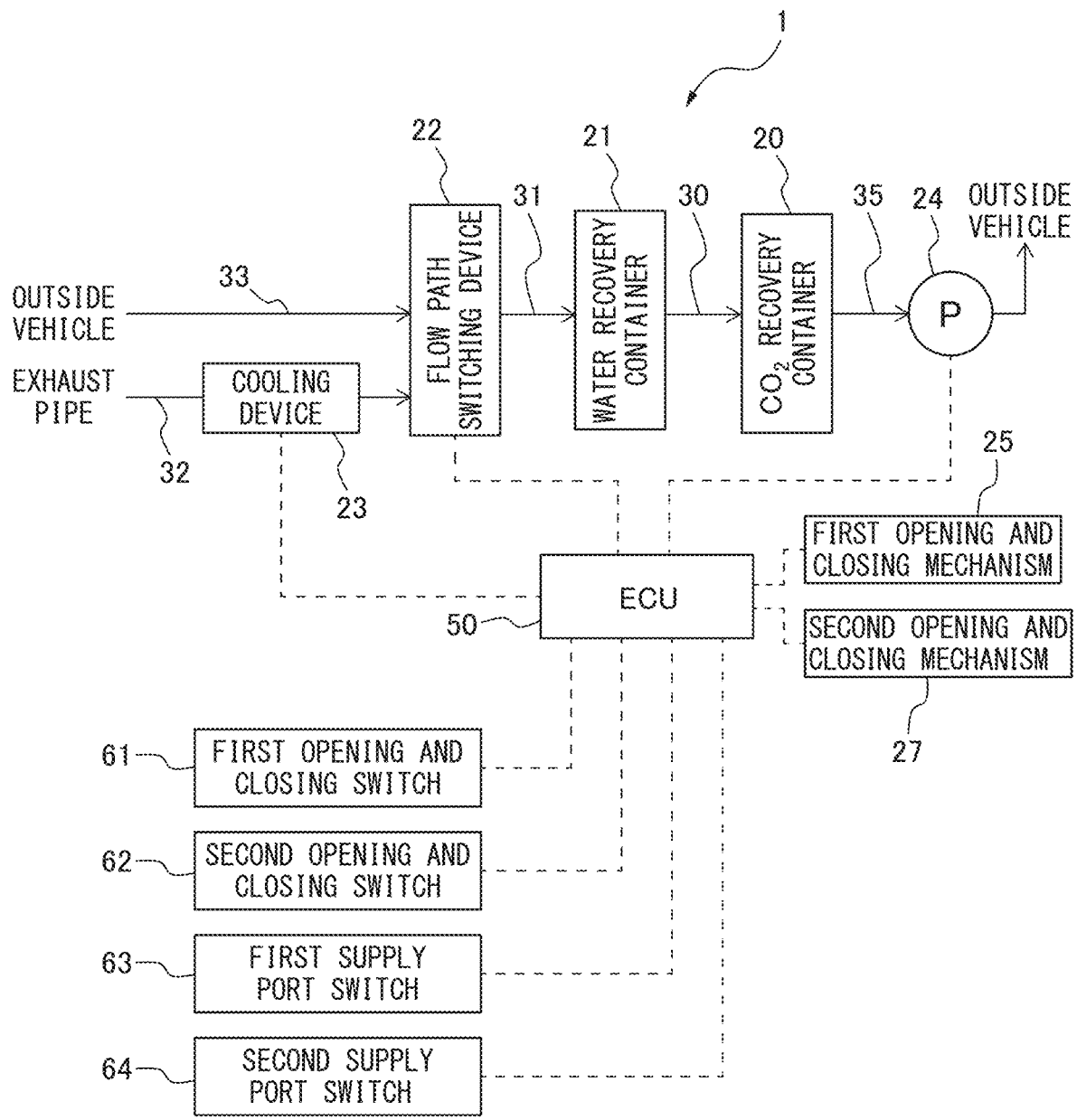
FIG. 4 is a view schematically showing a part of the configuration of the vehicle in FIG. 1.

FIG. 4 is a view schematically showing a part of the configuration of the vehicle 1 in FIG. 1. As shown in FIG. 4, the vehicle 1 is further provided with an electronic control unit (ECU) 50 performing the various control functions of the vehicle 1. Note that, in the present embodiment, a single ECU 50 is provided, but a plurality of ECUs may be provided for each function.

The ECU 50 is provided with a processor executing various processing, a memory storing programs and various information, an interface connected to various actuators and various sensors, etc. In the present embodiment, the ECU 50 is electrically connected to the flow path switching device 22, the cooling device 23, the suction pump 24, the first opening and closing mechanism 25, and the second opening and closing mechanism 27 and controls these. Specifically, the ECU 50 controls the ratio of the exhaust gas and atmosphere flowing into the second gas flow path 31, the operation of the cooling device 23, the operation of the suction pump 24, the opening and closing of the first discharge passage 36 by the first opening and closing mechanism 25, and the opening and closing of the second discharge passage 38 by the second opening and closing mechanism 27.

Further, the vehicle 1 is provided with a first opening and closing switch 61, a second opening and closing switch 62, a first supply port switch 63, and a second supply port switch 64. These switches are respectively arranged at, for example, positions in the passenger compartment where they can be operated from the driver's seat of the vehicle 1 and are electrically connected to the ECU 50.

If taking out the adsorbent adsorbing the $CO_2$ in the gas in the vehicle 1 from the vehicle 1, first, an adsorbent recovery container for recovering the adsorbent is installed below the first discharge passage 36. After that, when the driver of the vehicle 1 etc., operates the first opening and closing switch 61, an opening and closing signal is input from the first opening and closing switch 61 to the ECU 50. The ECU 50 controls the first opening and closing mechanism 25 so that the first opening and closing mechanism 25 opens the first discharge passage 36. As a result, the adsorbent inside of the $CO_2$ recovery container 20 passes through the first discharge passage 36 and is discharged from the adsorbent recovery container so the $CO_2$ adsorbed at the adsorbent is taken out to the outside of the vehicle 1. Therefore, according to the vehicle 1, the $CO_2$ adsorbed at the adsorbent at the vehicle 1 can be efficiently taken out to the outside of the vehicle 1.

If taking out the adsorbent adsorbing the water vapor in the gas in the vehicle 1 from the vehicle 1, first, an adsorbent recovery container for recovering the adsorbent is installed below the second discharge passage 38. After that, when the driver of the vehicle 1 etc., operates the second opening and closing switch 62, an opening and closing signal is input from the second opening and closing switch 62 to the ECU 50. The ECU 50 controls the second opening and closing mechanism 27 so that the second opening and closing mechanism 27 opens the second discharge passage 38. As a result, the adsorbent inside of the water recovery container 21 passes through the second discharge passage 38 and is discharged to the adsorbent recovery container so the water vapor adsorbed at the adsorbent is taken out to the outside of the vehicle 1. Therefore, according to the vehicle 1, the water vapor adsorbed at the adsorbent at the vehicle 1 can be efficiently taken out to the outside of the vehicle 1.

When the driver of the vehicle 1 etc., operates the first supply port switch 63, an opening and closing signal is input from the first supply port switch 63 to the ECU 50, and the ECU 50 unlocks the first supply port 26. As a result, the first supply port 26 is opened and adsorbent is supplied from the outside of the vehicle 1 to the $CO_2$ recovery container 20, that is, a new adsorbent can be supplied to the vehicle 1 in place of the adsorbent taken out from the vehicle 1. Therefore, according to the vehicle 1, it is possible to quickly replace the adsorbent in the $CO_2$ recovery container 20. The adsorbent is supplied, for example, using a pump etc.

When the driver of the vehicle 1 etc., operates the second supply port switch 64, an opening and closing signal is input from the second supply port switch 64 to the ECU 50, and the ECU 50 unlocks the second supply port 28. As a result, the second supply port 28 is opened and adsorbent is supplied from the outside of the vehicle 1 to the water recovery container 21, that is, a new adsorbent can be supplied to the vehicle 1 in place of the adsorbent taken out from the vehicle 1. Therefore, according to the vehicle 1, it is possible to quickly replace the adsorbent in the water recovery container 21. The adsorbent is supplied, for example, using a pump etc.

The adsorbent is taken out and supplied at for example a service station. By doing this, it is possible to replace the adsorbent while refueling and possible to reduce the trouble involved in replacing the adsorbent.

Note that, the flow path switching device 22 may be omitted from the vehicle 1, and the exhaust pipe connection passage 32 and the atmospheric connection passage 33 may be always connected to the $CO_2$ recovery container 20. Further, the atmospheric connection passage 33 and the flow path switching device 22 may be omitted from the vehicle 1, and the exhaust pipe 12 and water recovery container 21 may be connected through the exhaust pipe connection passage 32. That is, the $CO_2$ recovery system 2 may recover only the $CO_2$ in the exhaust gas discharged from the internal combustion engine 10.

Further, the vehicle 1 may be provided with a motor, and in addition to the internal combustion engine 10 or instead of the internal combustion engine 10, the motor may output power for driving use. That is, the vehicle 1 may be a hybrid vehicle (HV) or an electric vehicle (EV). If the vehicle 1 is an electric vehicle, the exhaust pipe connection passage 32 and the flow path switching device 22 are omitted from the vehicle 1, and the front of the vehicle 1 and the water recovery container 21 are connected through the atmospheric connection passage 33.

Further, if the adsorbent held in the $CO_2$ recovery container 20 can selectively adsorb $CO_2$, the water recovery container 21 may be omitted. In this case, the $CO_2$ recovery container 20 and the flow path switching device 22 are connected through the first gas flow path 30.

Further, the first opening and closing switch 61 may be arranged near the outlet of the first discharge passage 36 so as to enable a person taking out the adsorbent in the $CO_2$ recovery container 20 from the vehicle 1 to operate it from outside of the vehicle 1. Similarly, the second opening and closing switch 62 may be arranged near the outlet of the second discharge passage 38 so as to enable to a person taking out the adsorbent in the water recovery container 21 from the vehicle 1 to operate it from outside of the vehicle 1.

Further, the first opening and closing switch 61 and the second opening and closing switch 62 may be omitted, and the first opening and closing mechanism 25 and the second opening and closing mechanism 27 may be configured so as to be manually opened and closed from the outside of the vehicle 1.

Further, the first opening and closing mechanism 25 and the first opening and closing switch 61 may be omitted and the first discharge passage 36 may extend upward at a slant from the first holding space 202 toward the first discharge port like the first supply passage 37. In this case, when the first discharge port switch is operated and first discharge port is opened, a pump provided at the outside of the vehicle 1 etc., is used to suck out the adsorbent from the $CO_2$ recovery container 20 to the outside of the vehicle 1. The first discharge port is for example arranged at the side surface or back of the vehicle 1.

Further, the second opening and closing mechanism 27 and the second opening and closing switch 62 may be omitted, and the second discharge passage 38 may extend upward at a slant from the second holding space 212 toward the second discharge port like the second supply passage 39. In this case, when the first discharge port switch is operated and the first discharge port is opened, a pump provided at the outside of the vehicle 1 etc., is used to suck out the adsorbent from the water recovery container 21 to the outside of the vehicle 1. The second discharge port is for example arranged at the side surface or back of the vehicle 1.

Second Embodiment

The vehicle and $CO_2$ recovery method according to the second embodiment are basically the same was the vehicle and $CO_2$ recovery method according to the first embodiment except for the points explained below. For this reason, below, the second embodiment according to the present invention will be explained centered about parts different from the first embodiment.

Figure 5:
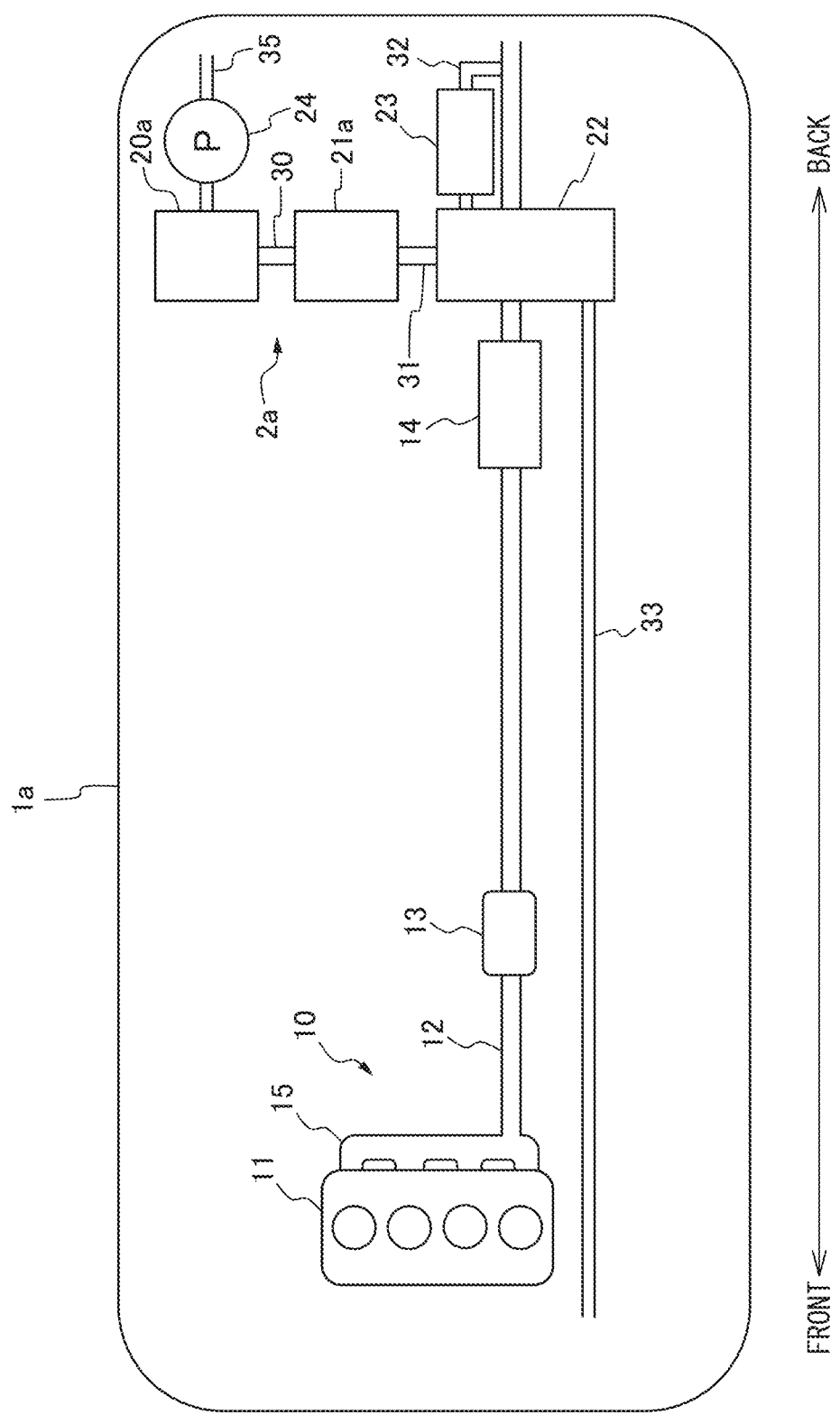
FIG. 5 is a view schematically showing a vehicle according to a second embodiment of the present invention.

FIG. 5 is a view schematically showing a vehicle 1*a* according to the second embodiment of the present invention. In the same way as the first embodiment, the vehicle 1*a* is provided with an internal combustion engine 10 and a $CO_2$ recovery system 2*a*, while the $CO_2$ recovery system 2*a* is provided with a $CO_2$ recovery container 20*a*, a water recovery container 21*a*, a flow path switching device 22, a cooling device 23, and a suction pump 24.

Figure 6:
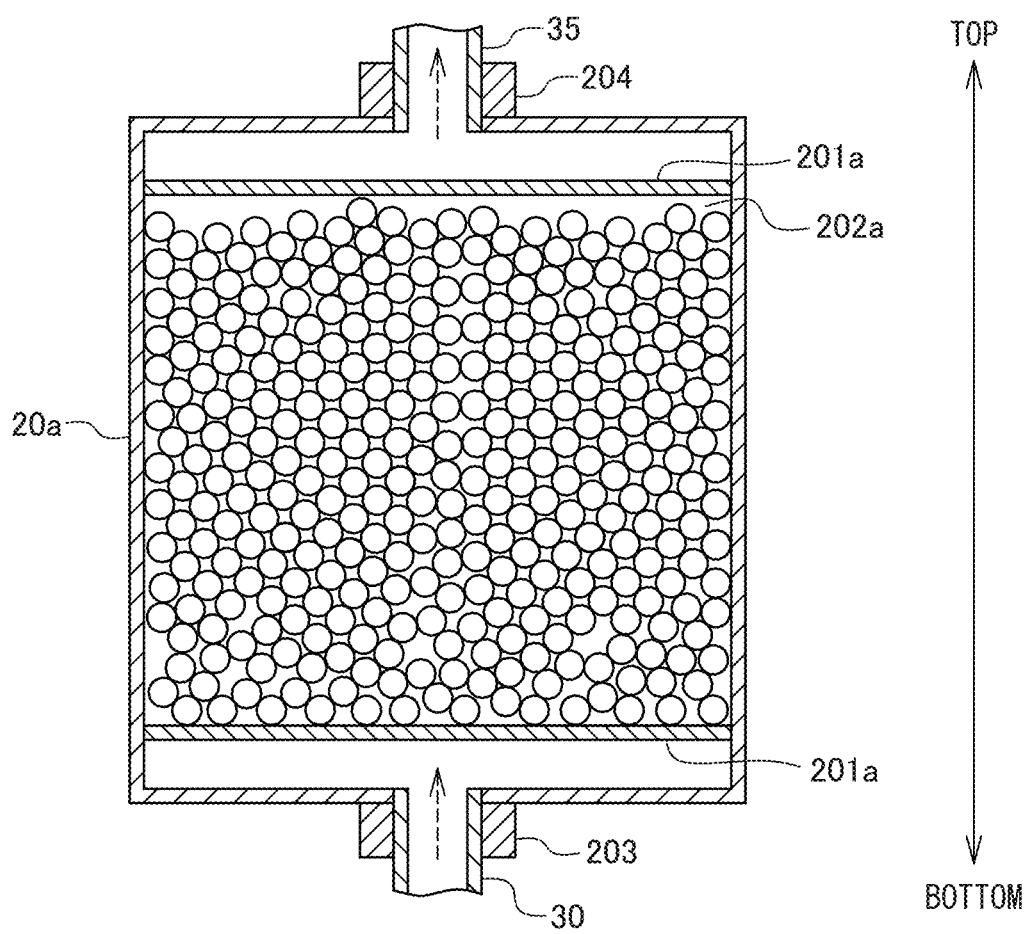
FIG. 6 is a schematic cross-sectional view of the $CO_2$ recovery container in FIG. 5.

FIG. 6 is a schematic cross-sectional view of a $CO_2$ recovery container 20*a* in FIG. 5. In the same way as the first embodiment, the $CO_2$ recovery container 20*a* has a first partition 201*a* defining a first holding space 202*a* holding the adsorbent. In the second embodiment, an upper side first partition 201*a* and a lower side first partition 201*a* respectively extend in the horizontal direction.

When the suction pump 24 provided at the gas outflow path 35 is operated, the gas flowing from the first gas flow path 30 into the $CO_2$ recovery container 20*a* moves upward in the vertical direction in the $CO_2$ recovery container 20*a*. At this time, the gas passing through the lower side first partition 201*a* contacts the adsorbent at the first holding space 202*a* and the adsorbent adsorbs the $CO_2$ in the gas. The gas from which $CO_2$ is recovered runs from the first holding space 202*a* through the upper side first partition 201*a* and is discharged to the gas outflow path 35. FIG. 6 shows the direction of flow of gas flowing into the $CO_2$ recovery container 20a by a broken line arrow.

In the second embodiment, the $CO_2$ recovery container 20a has a first connecting part 203 and a second connecting part 204. The $CO_2$ recovery container 20a is connected to the first gas flow path 30 through the first connecting part 203 and is connected to the gas outflow path 35 through the second connecting part 204.

The $CO_2$ recovery container 20a can be detached from the first connecting part 203 and the second connecting part 204 and in turn can be detached from the vehicle 1a. Therefore, the vehicle 1a is configured so that the adsorbent in the $CO_2$ recovery container 20a is taken out from the vehicle 1a.

By detaching the first gas flow path 30 from the first connecting part 203, the $CO_2$ recovery container 20a and the first gas flow path 30 can be disconnected. Further, by detaching the gas outflow path 35 from the second connecting part 204, the $CO_2$ recovery container 20a and the gas outflow path 35 can be disconnected. As a result, it is possible to take out the $CO_2$ recovery container 20a from the vehicle 1a and in turn possible to take out the $CO_2$ adsorbed at the adsorbent inside the $CO_2$ recovery container 20a to the outside of the vehicle 1. Therefore, according to the vehicle 1a, it is possible to efficiently take out the $CO_2$ adsorbed at the adsorbent in the vehicle 1a to the outside of the vehicle 1a. Note that, when taking out the $CO_2$ recovery container 20a from the vehicle 1a, the first connecting part 203 and the second connecting part 204 may be capped so that the $CO_2$ adsorbed at the adsorbent does not leak to the outside of the $CO_2$ recovery container 20a.

Further, by connecting the first gas flow path 30 to the first connecting part 203 and connecting the gas outflow path 35 to the second connecting part 204, it is possible to install a new $CO_2$ recovery container 20a holding a new adsorbent at the vehicle 1a. Therefore, according to the vehicle 1a, it is possible to quickly replace the $CO_2$ recovery container 20a and in turn quickly replace the adsorbent carried in the vehicle 1a.

Note that, only the part holding the adsorbent in the $CO_2$ recovery container 20a (first holding space 202a) may be detachable from the vehicle 1a. In this case, the first connecting part 203 and the second connecting part 204 are omitted, and the $CO_2$ recovery container 20a remains connected to the first gas flow path 30 and the gas outflow path 35. Further, in this case, the part detached from the vehicle 1a has the form of for example a cartridge. Therefore, it is sufficient that at least a part of the $CO_2$ recovery container 20a can be detached from the vehicle 1a.

Figure 7:
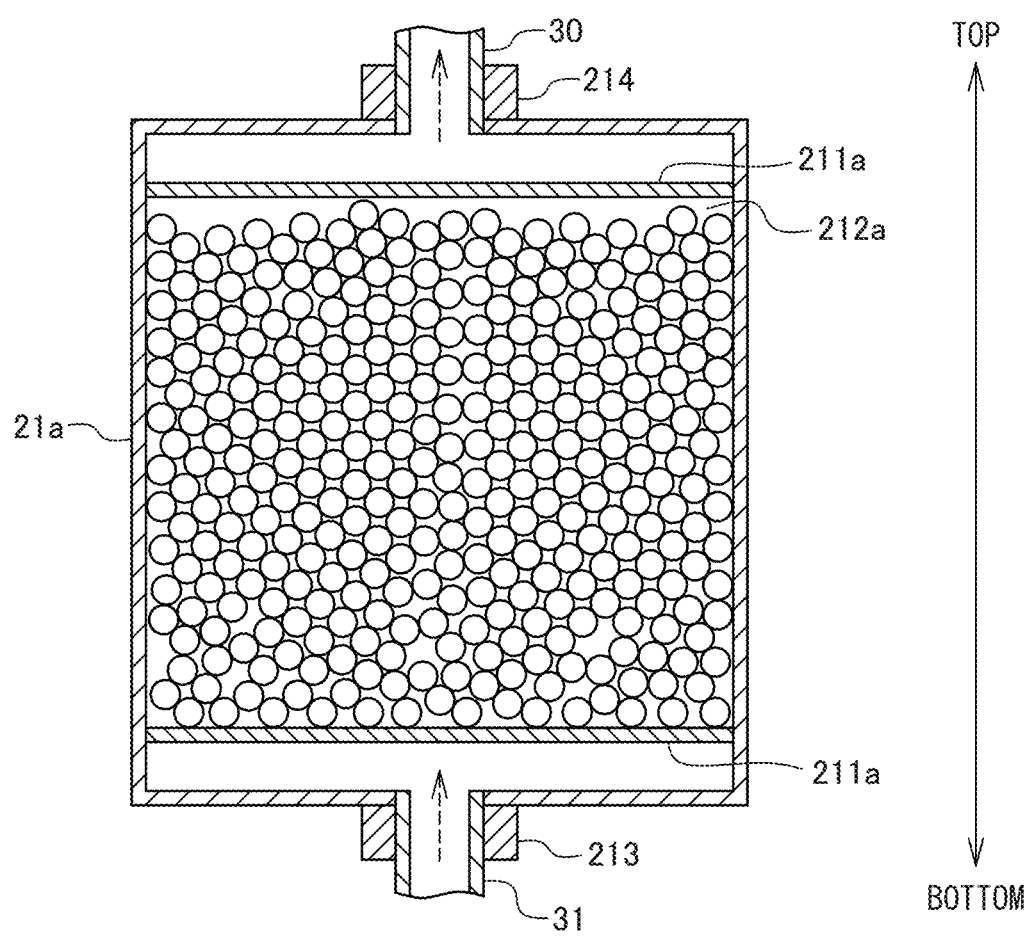
FIG. 7 is a schematic cross-sectional view of the water recovery container in FIG. 5.

FIG. 7 is a schematic cross-sectional view of the water recovery container 21a in FIG. 5. In the same way as the first embodiment, the water recovery container 21a has a second partition 211a defining a second holding space 212a holding an adsorbent. The second partition 211a is configured in the same way as the first partition 201a and functions in the same way as the first partition 201a.

When the suction pump 24 provided at the gas outflow path 35 is operated, the gas flowing from the second gas flow path 31 into the water recovery container 21a moves upward in the vertical direction in the water recovery container 21a. At this time, the gas which passed through the lower side second partition 211a contacts the adsorbent at the second holding space 212a and the adsorbent adsorbs the water vapor in the gas. The gas from which water vapor is recovered is discharged from the second holding space 212a through the upper side second partition 211a to the first gas flow path 30. FIG. 7 shows the direction of flow of gas flowing into the water recovery container 21a by a broken line arrow.

In the second embodiment, the water recovery container 21a has a third connecting part 213 and a fourth connecting part 214. The water recovery container 21a is connected through the third connecting part 213 to the second gas flow path 31 and is connected through the fourth connecting part 214 to the first gas flow path 30.

The water recovery container 21a can be detached from the third connecting part 213 and the fourth connecting part 214 and in turn can be detached from the vehicle 1a. Therefore, the vehicle 1a is configured so that the adsorbent inside the water recovery container 21a is taken out from the vehicle 1a.

By detaching the second gas flow path 31 from the third connecting part 213, it is possible to disconnect the water recovery container 21a and the second gas flow path 31. Further, by detaching the first gas flow path 30 from the fourth connecting part 214, it is possible to disconnect the water recovery container 21a and the first gas flow path 30. As a result, the water recovery container 21a can be taken out from the vehicle 1a and in turn the water vapor adsorbed at the adsorbent inside the water recovery container 21a can be taken out from the vehicle 1. Therefore, according to the vehicle 1a, the water vapor adsorbed at the adsorbent in the vehicle 1a can be efficiently taken out from the vehicle 1a. Note that, when taking out the water recovery container 21a from the vehicle 1a, the third connecting part 213 and fourth connecting part 214 may be capped so that the water vapor adsorbed at the adsorbent does not leak to the outside of the water recovery container 21a.

Further, by connecting the second gas flow path 31 to the third connecting part 213 and connecting the first gas flow path 30 to the fourth connecting part 214, it is possible to install a new water recovery container 21a holding a new adsorbent in the vehicle 1a. Therefore, according to the vehicle 1a, it is possible to quickly replace the water recovery container 21a and in turn possible to quickly replace the adsorbent carried in the vehicle 1a.

Note that, only the part holding the adsorbent in the water recovery container 21a (the second holding space 212a) may be detachable from the vehicle 1a. In this case, the third connecting part 213 and the fourth connecting part 214 are omitted, and the water recovery container 21a remains connected to the second gas flow path 31 and the first gas flow path 30. Further, in this case, the part detached from the vehicle 1a has the form of for example a cartridge. Therefore, it is sufficient that at least a part of the water recovery container 21a can be detached from the vehicle 1a.

Further, instead of the $CO_2$ recovery container 20a, the $CO_2$ recovery container 20 in the first embodiment may be used. That is, only the water recovery container 21a may be detachable. Further, instead of the water recovery container 21a, the water recovery container 21 in the first embodiment may be used. That is, only the $CO_2$ recovery container 20a may be detachable.

Third Embodiment

The vehicle and $CO_2$ recovery method according to the third embodiment are basically the same as the vehicle and $CO_2$ recovery method according to the first embodiment except for the points explained below. For this reason, below, the third embodiment according to the present invention will be explained centered about parts different from the first embodiment.

Figure 8:
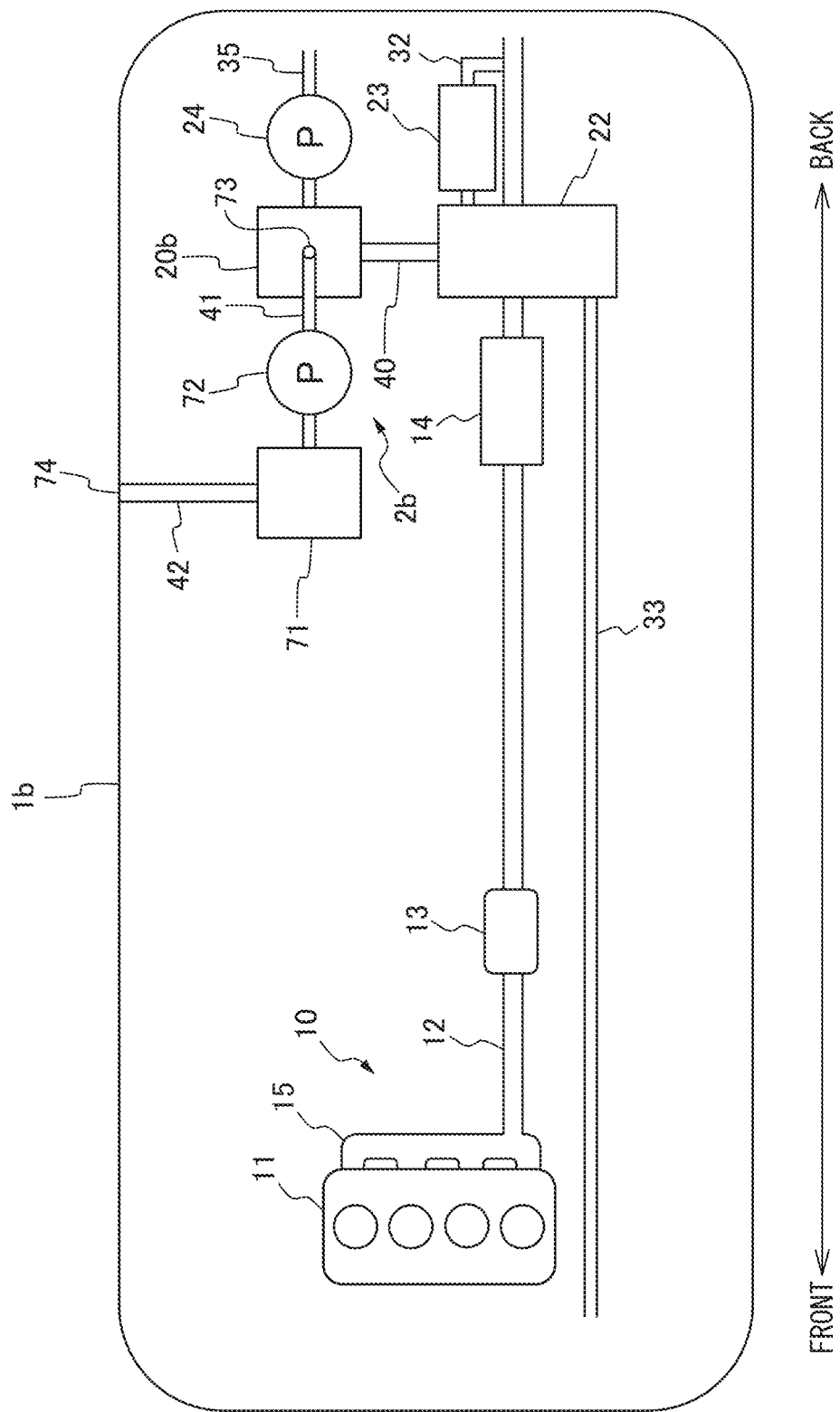
FIG. 8 is a view schematically showing a vehicle according to a third embodiment of the present invention.

FIG. 8 is a view schematically showing the vehicle 1b according to the third embodiment of the present invention. In the same way as the first embodiment, the vehicle 1b is provided with an internal combustion engine 10 and a $CO_2$ recovery system 2b. The $CO_2$ recovery system 2b is provided with a $CO_2$ recovery container 20b, a flow path switching device 22, a cooling device 23, a suction pump 24, an adsorbent storage container 71, an adsorbent pump 72, and an adsorbent injector 73.

In the third embodiment, the chemical absorption method is used as the method of recovery of $CO_2$ in the $CO_2$ recovery container 20b, and as the adsorbent held in the $CO_2$ recovery container 20b, a liquid adsorbent (for example an amine solution) is used. In the chemical absorption method, $CO_2$ is desorbed from the adsorbent by contacting the gas containing $CO_2$ with the adsorbent and heating the adsorbent.

The flow path switching device 22 is arranged at the upstream side of the $CO_2$ recovery container 20b in the direction of flow of gas and is connected to the $CO_2$ recovery container 20b through the gas flow path 40. The gas flow path 40 is communicated with the flow path switching device 22 at the upstream side end part and is communicated with the $CO_2$ recovery container 20b at the downstream side end part. Therefore, the gas flowing out from the flow path switching device 22 flows through the gas flow path 40 into the $CO_2$ recovery container 20b.

The adsorbent storage container 71 stores adsorbent before contacting gas in the $CO_2$ recovery container 20b. The adsorbent storage container 71 is arranged inside or below the luggage space positioned at the back of the vehicle 1b and is arranged so as to adjoin the $CO_2$ recovery container 20b. The adsorbent storage container 71 is connected to the $CO_2$ recovery container 20b through a loading passage 41.

The adsorbent pump 72 is provided at the loading passage 41. The loading passage 41 is communicated with the adsorbent storage container 71 at one end part and is communicated with the adsorbent injector 73 at the other end part. The adsorbent pump 72 transports the adsorbent from the adsorbent storage container 71 to the adsorbent injector 73. The adsorbent injector 73 injects the adsorbent into the $CO_2$ recovery container 20b so that the adsorbent contacts the gas.

Figure 9:
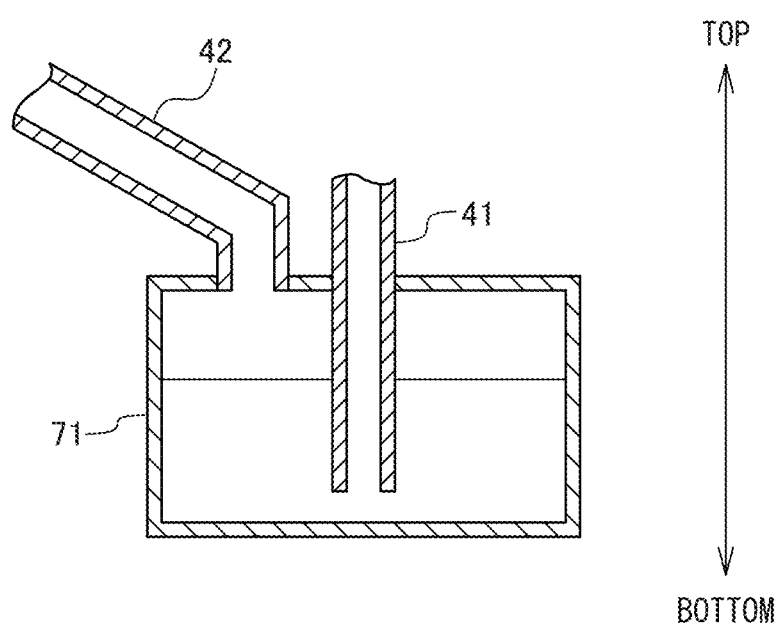
FIG. 9 is a schematic cross-sectional view of the adsorbent storage container in FIG. 8.

FIG. 9 is a schematic cross-sectional view of the adsorbent storage container 71 in FIG. 8. The adsorbent storage container 71 has a substantially columnar shape and stores a liquid adsorbent (for example an amine solution). The adsorbent storage container 71 is connected to the loading passage 41. In the present embodiment, the loading passage 41 is connected to the top part of the adsorbent storage container 71. For this reason, when the adsorbent pump 72 provided at the loading passage 41 is operated, the adsorbent in the adsorbent storage container 71 is sucked up to the inside of the loading passage 41.

Further, the vehicle 1b is provided with a supply passage 42. As shown in FIG. 8, the supply passage 42 connects the outside of the vehicle 1b and the adsorbent storage container 71 and supplies an adsorbent from the outside of the vehicle 1b to the adsorbent storage container 71. The supply passage 42 is communicated with the outside of the vehicle 1b through a supply port 74 at one end part and is communicated with the inside of adsorbent storage container 71 at the other end part. The supply passage 42 extends upward at a slant from the adsorbent storage container 71 toward the supply port 74. In the present embodiment, the supply port 74 is arranged at the side surface of the vehicle 1b.

Figure 10:
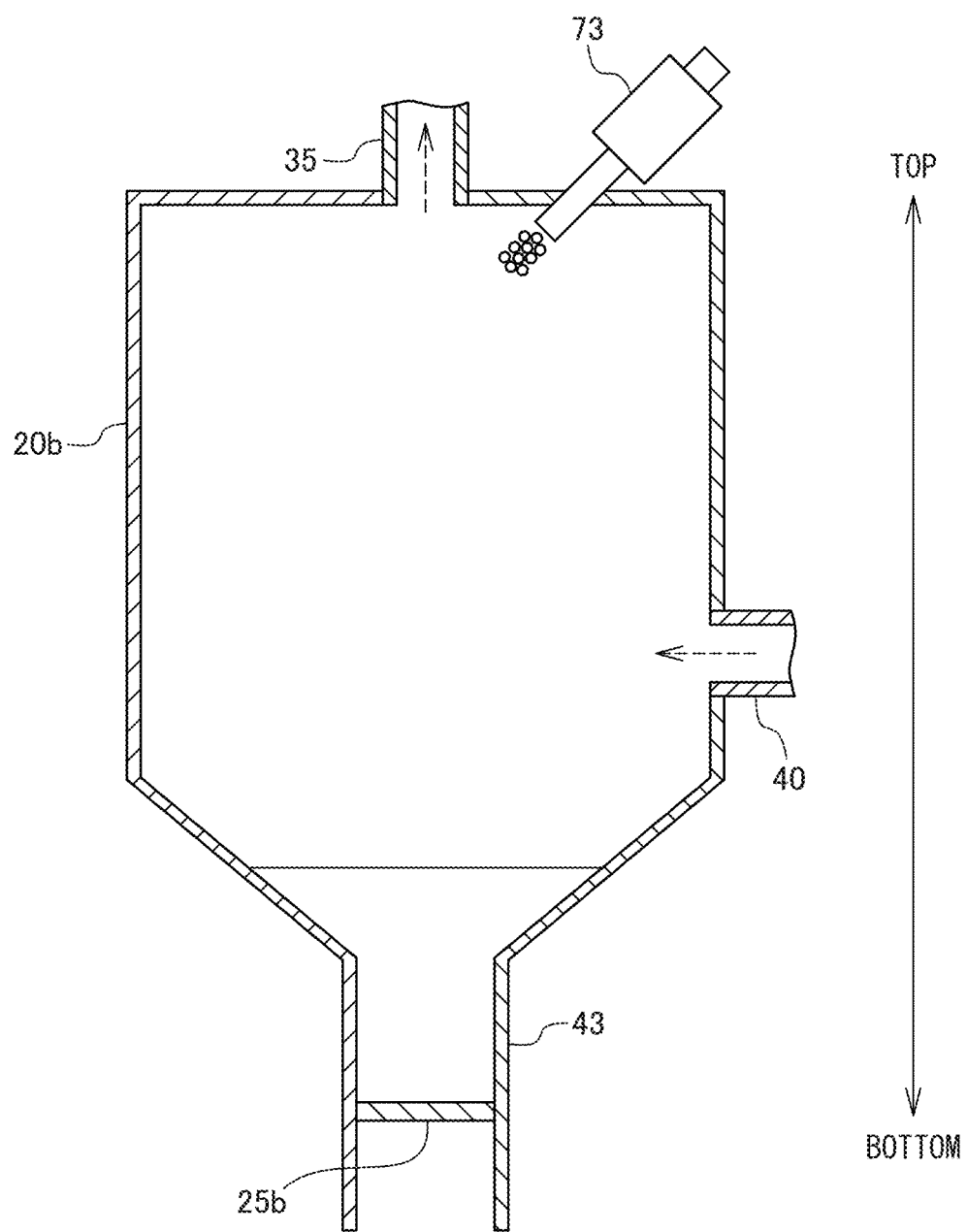
FIG. 10 is a schematic cross-sectional view of the $CO_2$ recovery container in FIG. 8.

FIG. 10 is a schematic cross-sectional view of the $CO_2$ recovery container 20b in FIG. 8. In the present embodiment, the $CO_2$ recovery container 20b has a substantially columnar shape and holds a liquid adsorbent (for example an amine solution).

The $CO_2$ recovery container 20b is connected to the gas flow path 40 at the upstream side in the direction of flow of gas and is connected to the gas outflow path 35 at the downstream side in the direction of flow of gas. In the present embodiment, the gas flow path 40 is connected to the side part of the $CO_2$ recovery container 20b, while the gas outflow path 35 is connected to the top part of the $CO_2$ recovery container 20b. For this reason, when the suction pump 24 provided at the gas outflow path 35 is operated, the gas flowing into the $CO_2$ recovery container 20b moves upward in the vertical direction in the $CO_2$ recovery container 20b. At this time, the adsorbent injected from the adsorbent injector 73 contacts the gas and adsorbs the $CO_2$ in the gas. The gas from which $CO_2$ is recovered is discharged from the $CO_2$ recovery container 20b to the gas outflow path 35. FIG. 10 shows the direction of flow of gas flowing into the $CO_2$ recovery container 20b by a broken line arrow. On the other hand, the adsorbent adsorbing the $CO_2$ in the gas drops down to the bottom part of the $CO_2$ recovery container 20b.

Further, the vehicle 1b is provided with a discharge passage 43 and an opening and closing mechanism 25b. The discharge passage 43 connects the $CO_2$ recovery container 20b and the outside of the vehicle 1b and discharges adsorbent from the $CO_2$ recovery container 20b to the outside of the vehicle 1b. The discharge passage 43 communicates with the inside of the $CO_2$ recovery container 20b at one end part and communicates with the outside of the vehicle 1b at the other end part. The discharge passage 43 extends from the $CO_2$ recovery container 20a downward toward the bottom of the vehicle 1b.

The opening and closing mechanism 25b is provided at the discharge passage 43 and is configured to open and close the discharge passage 43. The opening and closing mechanism 25b is configured in the same way as the first opening and closing mechanism 25 of the first embodiment and functions in the same way as the first opening and closing mechanism 25.

As shown in FIG. 10, the bottom part of the $CO_2$ recovery container 20b is connected to the discharge passage 43 and extends downward at a slant toward the discharge passage 43. When the opening and closing mechanism 25b closes the discharge passage 43, the adsorbent held at the bottom of the $CO_2$ recovery container 20b is supported by the $CO_2$ recovery container 20b and the opening and closing mechanism 25b and is held inside of the $CO_2$ recovery container 20b. On the other hand, When the opening and closing mechanism 25b opens the discharge passage 43, the adsorbent is discharged by gravity from the $CO_2$ recovery container 20b through the discharge passage 43 to the outside of the vehicle 1b. Therefore, the vehicle 1b is configured so that the adsorbent inside of the $CO_2$ recovery container 20b is taken out from the vehicle 1b.

Figure 11:
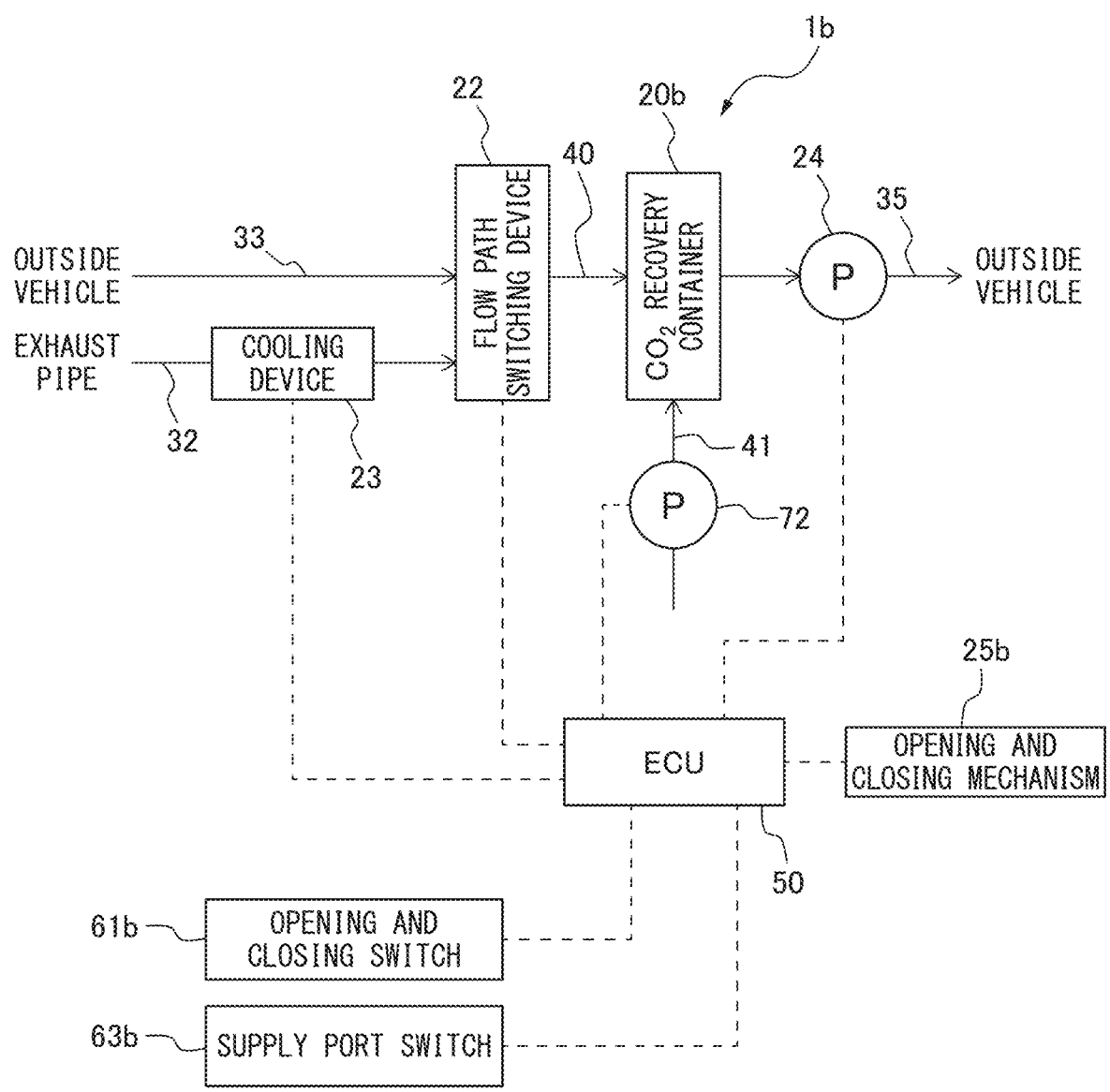
FIG. 11 is a view schematically showing a part of the configuration of the vehicle in FIG. 8.

FIG. 11 is a view schematically showing a part of the configuration of the vehicle 1b in FIG. 8. In the same way as the first embodiment, the vehicle 1b is further provided with an ECU 50 performing the various control functions of the vehicle 1b. In the third embodiment, the ECU 50 is electrically connected to the flow path switching device 22, the cooling device 23, the suction pump 24, the adsorbent pump 72, and the opening and closing mechanism 25b and controls these. Specifically, the ECU 50 controls the ratio of the exhaust gas and atmosphere flowing into the gas flow path 40, the operation of the cooling device 23, the operation of the suction pump 24, the operation of the adsorbent pump 72, and the opening and closing of the discharge passage 43 by the opening and closing mechanism 25b.

Further, the vehicle 1b is provided with an opening and closing switch 61b and a supply port switch 63b. The opening and closing switch 61b and the supply port switch 63b are respectively arranged at, for example, positions in the passenger compartment able to be operated from the driver's seat of the vehicle 1b and are electrically connected to the ECU 50.

If taking out from the vehicle 1b the adsorbent adsorbing the $CO_2$ in the gas in the vehicle 1b, first, an adsorbent recovery container for recovering the adsorbent is installed below the discharge passage 43. After that, when the driver of the vehicle 1b etc., operates the opening and closing switch 61b, an opening and closing signal is input from the opening and closing switch 61b to the ECU 50 and the ECU 50 controls the opening and closing mechanism 25b so that the opening and closing mechanism 25b opens the discharge passage 43. As a result, the adsorbent inside the $CO_2$ recovery container 20b is discharged through the discharge passage 43 to the adsorbent recovery container of the vehicle 1b and the $CO_2$ adsorbed at the adsorbent is taken out to the outside of the vehicle 1b. Therefore, according to the vehicle 1b, in the vehicle 1b, the $CO_2$ adsorbed at the adsorbent can be efficiently taken out to the outside of the vehicle 1b.

When the driver of the vehicle 1b etc., operates the supply port switch 63b, an opening and closing signal is input from the supply port switch 63b to the ECU 50 and the ECU 50 unlocks the supply port 74. As a result, the supply port 74 is opened and the adsorbent can be supplied from the vehicle 1b to the adsorbent storage container 71, that is, a new adsorbent can be supplied to the vehicle 1b in place of the adsorbent taken out from the vehicle 1b. Therefore, according to the vehicle 1b, the adsorbent inside of the vehicle 1b can be quickly replaced. The adsorbent is supplied for example using a pump etc.

Note that, in the same way as the first embodiment, in order to recover the water vapor in the gas flowing into the $CO_2$ recovery container 20b, the water recovery container 21 may be provided between the flow path switching device 22 and the $CO_2$ recovery container 20b.

Further, the opening and closing switch 61b may be arranged near the outlet of the discharge passage 43 so as to enable a person taking out the adsorbent in the $CO_2$ recovery container 20b from the vehicle 1 to operate it from outside of the vehicle 1b.

Further, the opening and closing switch 61b may be omitted and the opening and closing mechanism 25b may be configured to be opened and closed manually from the outside of the vehicle 1.

Further, the opening and closing mechanism 25b and the opening and closing switch 61b may be omitted, and the discharge passage 43 may extend upward at a slant from the $CO_2$ recovery container 20b toward the discharge port. In this case, when the discharge port switch is operated and the discharge port is opened, a pump etc., provided at the outside of the vehicle 1b is used to suck out the adsorbent from the $CO_2$ recovery container 20b to the outside of the vehicle 1b. The discharge port is for example arranged at the side surface or the back of the vehicle 1.

Fourth Embodiment

The vehicle and $CO_2$ recovery method according to the fourth embodiment are basically the same was the vehicle and $CO_2$ recovery method according to the third embodiment except for the points explained below. For this reason, below, the fourth embodiment according to the present invention will be explained centered about parts different from the third embodiment.

Figure 12:
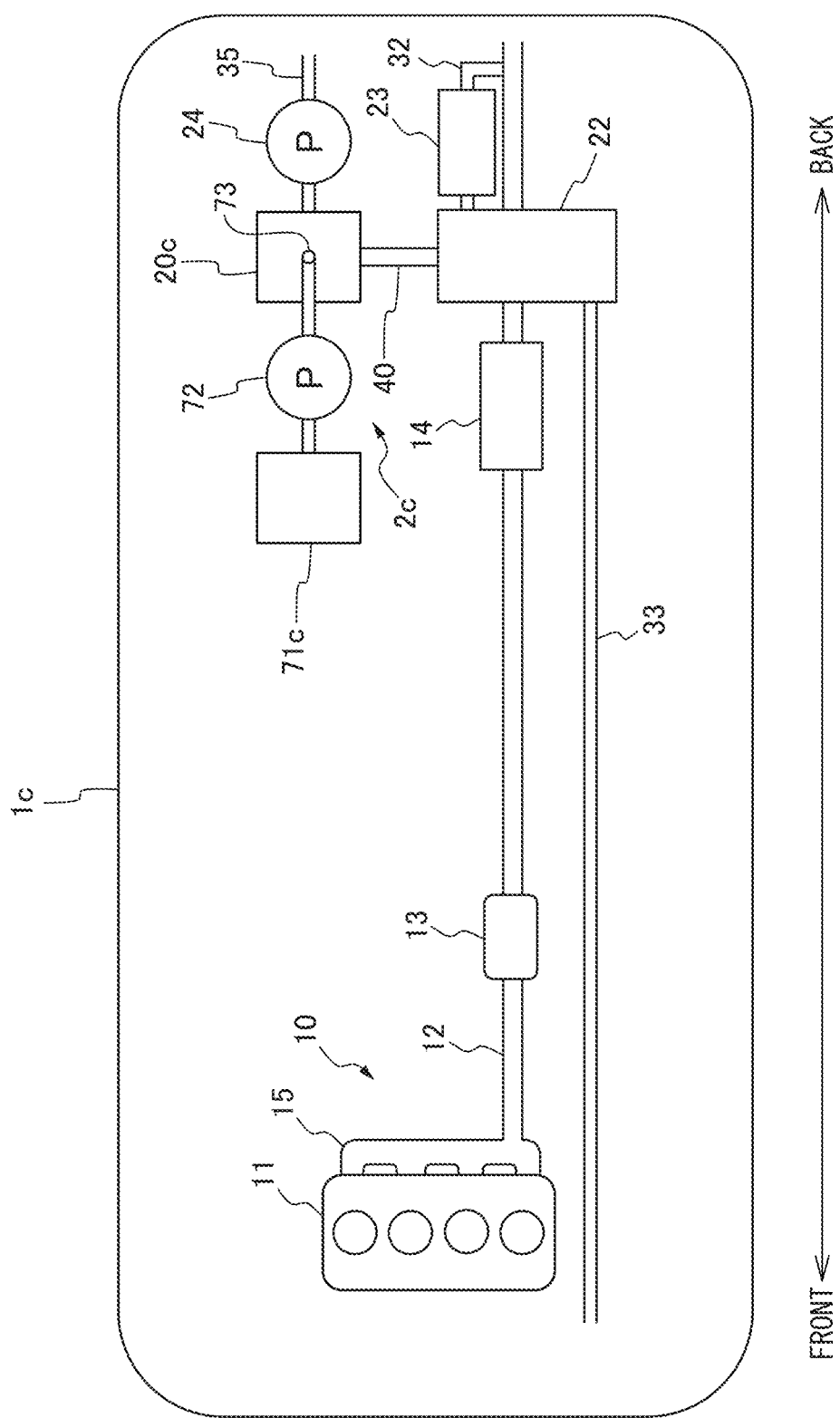
FIG. 12 is a view schematically showing a vehicle according to a fourth embodiment of the present invention.

FIG. 12 is a view schematically showing the vehicle 1c according to the fourth embodiment of the present invention. In the same way as the third embodiment, the vehicle 1c is provided with an internal combustion engine 10 and a $CO_2$ recovery system 2c. The $CO_2$ recovery system 2c is provided with a $CO_2$ recovery container 20c, a flow path switching device 22, a cooling device 23, a suction pump 24, an adsorbent storage container 71c, an adsorbent pump 72, and adsorbent injector 73.

Figure 13:
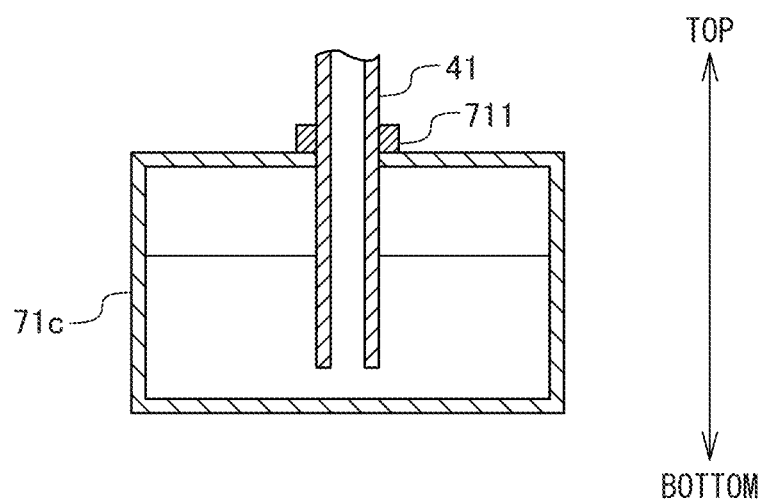
FIG. 13 is a schematic cross-sectional view of the adsorbent storage container in FIG. 12.

FIG. 13 is a schematic cross-sectional view of the adsorbent storage container 71c in FIG. 12. In the fourth embodiment, the adsorbent storage container 71c has a fifth connecting part 711. The adsorbent storage container 71 is connected with the loading passage 41 through the fifth connecting part 711.

The adsorbent storage container 71c can be detached from the fifth connecting part 711 and in turn can be detached from the vehicle 1c. By detaching the loading passage 41 from the fifth connecting part 711, the adsorbent storage container 71c and the loading passage 41 can be disconnected. As a result, the adsorbent storage container 71c can be detached from the vehicle 1c. Note that, at this time, the fifth connecting part 711 may be capped so that the adsorbent does not leak to the outside of the adsorbent storage container 71c.

Further, by connecting the loading passage 41 to the fifth connecting part 711, it is possible to install a new adsorbent storage container 71c storing a new adsorbent in the vehicle 1c. Therefore, according to the vehicle 1a, it is possible to quickly replace the adsorbent storage container 71c.

Note that, in the adsorbent storage container 71c, only the part holding the adsorbent may be detachable from the vehicle 1c. In this case, the fifth connecting part 711 is omitted and the adsorbent storage container 71c remains connected to the loading passage 41. Further, in this case, the part detached from the vehicle 1c has the form of for example a cartridge. Therefore, it is sufficient that at least a part of the adsorbent storage container 71c can be detached from the vehicle 1c.

Figure 14:
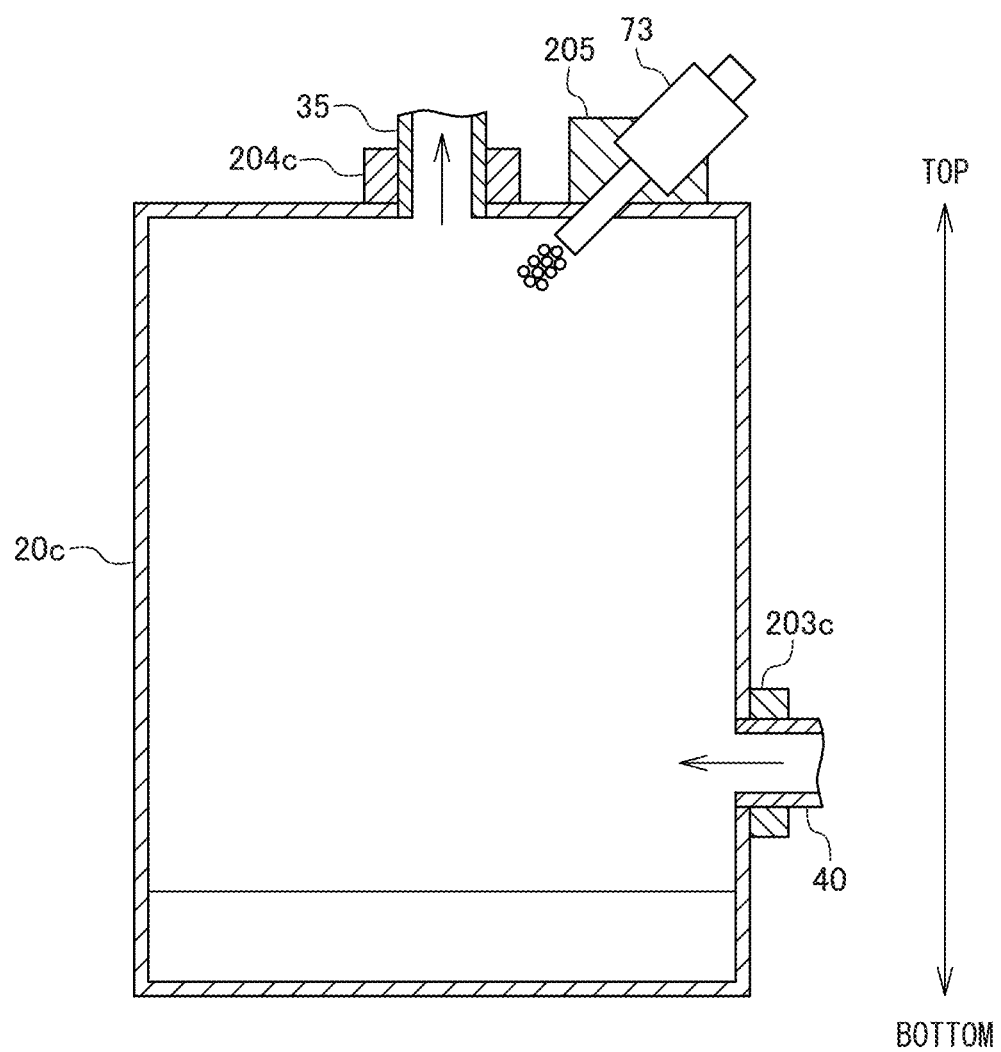
FIG. 14 is a schematic cross-sectional view of the $CO_2$ recovery container in FIG. 12.

FIG. 14 is a schematic cross-sectional view of the $CO_2$ recovery container 20c in FIG. 12. In the fourth embodiment, the bottom part of the $CO_2$ recovery container 20c extends in the horizontal direction.

When the suction pump 24 provided at the gas outflow path 35 is operated, the gas flowing from the gas flow path 40 into the $CO_2$ recovery container 20c moves upward in the vertical direction in the $CO_2$ recovery container 20c. At this time, the adsorbent injected from the adsorbent injector 73 contacts the gas and adsorbs the $CO_2$ in the gas. The gas from which $CO_2$ is recovered is discharged from the inside of the $CO_2$ recovery container 20c to the gas outflow path 35. FIG. 14 shows the direction of flow of gas flowing into the $CO_2$ recovery container 20c by a broken line arrow. On the other hand, the adsorbent adsorbing the $CO_2$ in the gas drops down to the bottom part of the $CO_2$ recovery container 20c.

In the fourth embodiment, the $CO_2$ recovery container 20c has a first connecting part 203c, a second connecting part 204c, and a fastening part 205. The $CO_2$ recovery container 20c is connected to the gas flow path 40 through the first connecting part 203c and is connected to the gas outflow path 35 through the second connecting part 204c. The fastening part 205 fastens the adsorbent injector 73 to the $CO_2$ recovery container 20c so that the adsorbent injector 73 injects an adsorbent into the $CO_2$ recovery container 20c.

The $CO_2$ recovery container 20c can be detached from the first connecting part 203 and the second connecting part 204 and in turn can be detached from the vehicle 1c. Therefore, the vehicle 1c is configured so that the adsorbent inside of the $CO_2$ recovery container 20c is taken out from the vehicle 1c.

By detaching the gas flow path 40 from the first connecting part 203c, the $CO_2$ recovery container 20c and the gas flow path 40 can be disconnected. Further, by detaching the gas outflow path 35 from the second connecting part 204c, the $CO_2$ recovery container 20c and the gas outflow path 35 can be disconnected. Further, by detaching the adsorbent injector 73 from the fixing part 205, the $CO_2$ recovery container 20c and the adsorbent injector 73 can be disconnected. As a result, it is possible to take out the $CO_2$ recovery container 20c from the vehicle 1c and in turn take out the $CO_2$ adsorbed at the adsorbent in the $CO_2$ recovery container 20c to the outside of the vehicle 1c. Note that, when taking out the $CO_2$ recovery container 20c from the vehicle 1c, the first connecting part 203c, the second connecting part 204c, and the fastening part 205 may be capped so that the $CO_2$ adsorbed at the adsorbent does not leak to the outside of the $CO_2$ recovery container 20c.

Further, by connecting the gas flow path 40 to the first connecting part 203c and connecting the gas outflow path 35 to the second connecting part 204c and by fastening the adsorbent injector 73 through the fastening part 205 to the $CO_2$ recovery container 20c, a new $CO_2$ recovery container 20c can be installed in the vehicle 1c. Therefore, according to the vehicle 1c, it is possible to quickly replace the $CO_2$ recovery container 20c.

Note that, in the $CO_2$ recovery container 20c, only the part holding the adsorbent may be detachable from the vehicle 1c. In this case, the first connecting part 203c and the second connecting part 204c are omitted and the $CO_2$ recovery container 20c remains connected to the gas flow path 40 and the gas outflow path 35. Further, in this case, the part detached from the vehicle 1c has the form of for example a cartridge. Therefore, it is sufficient that at least a part of the $CO_2$ recovery container 20c can be detached from the vehicle 1c.

Further, instead of the $CO_2$ recovery container 20c, the $CO_2$ recovery container 20b in the third embodiment may be used. That is, only the adsorbent storage container 71c may be detachable. Further, instead of the adsorbent storage container 71c, the adsorbent storage container 71 at the third embodiment may be used. That is, only the $CO_2$ recovery container 20c may be detachable.

Fifth Embodiment

The vehicle and $CO_2$ recovery method according to the fifth embodiment are basically the same as the vehicle and $CO_2$ recovery method according to the first embodiment except for the points explained below. For this reason, below, the fifth embodiment according to the present invention will be explained centered about parts different from the first embodiment.

As explained above, the adsorbent adsorbing $CO_2$ in the gas in the vehicle 1 passes through the first discharge passage 36 and is taken out to the outside of the vehicle 1. In order to make active use of the $CO_2$ adsorbed at the adsorbent as a resource, it is necessary to make the $CO_2$ desorb from the adsorbent. Further, in order to use the adsorbent to again recover $CO_2$, it is necessary to make $CO_2$ desorb from the adsorbent to regenerate the adsorbent.

However, if making $CO_2$ desorb from adsorbents taken out from individual vehicles 1, the frequency of supply of energy for making the $CO_2$ desorb becomes greater and energy is wasted. Therefore, in the fifth embodiment, $CO_2$ is simultaneously desorbed from the adsorbents taken out from the plurality of vehicles 1. By doing this, it is possible to decrease the energy consumed for making the $CO_2$ desorb from the adsorbents.

Figure 15:
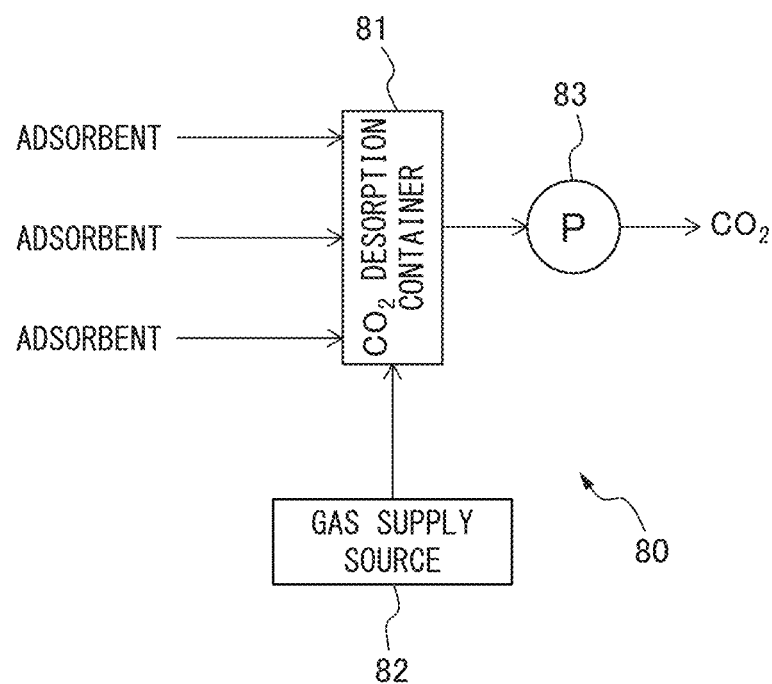
FIG. 15 is a view schematically showing a $CO_2$ desorption system according to a fifth embodiment of the present invention.

FIG. 15 is a view schematically showing a $CO_2$ desorption system 80 according to the fifth embodiment of the present invention. The $CO_2$ desorption system 80 is, for example, provided at a facility for taking out adsorbents from vehicles 1 (service station etc.) and simultaneously desorbs $CO_2$ from adsorbents taken out from the plurality of vehicles 1. Note that, the $CO_2$ desorption system 80 may be provided at another facility separate from the facility for taking out adsorbents from vehicles 1. In this case, the adsorbents taken out from the vehicles 1 are transported to a facility where the $CO_2$ desorption system 80 is provided.

The $CO_2$ desorption system 80 is provided with a $CO_2$ desorption container 81, a gas supply source 82, and a $CO_2$ pump 83. The adsorbents taken out from the vehicles 1 are charged into the $CO_2$ desorption container 81. For this reason, the $CO_2$ desorption container 81 holds adsorbents taken out from the plurality of vehicles 1. Note that, the adsorbents taken out from the vehicles 1 may be temporarily stored in storage containers and charged into the $CO_2$ desorption container 81 through the storage containers.

The gas supply source 82 supplies gas having a concentration of $CO_2$ less than a predetermined value to the adsorbents in the $CO_2$ desorption container 81. For example, the predetermined value is the concentration of $CO_2$ in the atmosphere (350 ppm to 450 ppm), and the gas supplied to the gas supply source 82 is gas having a 0% concentration of $CO_2$ (for example nitrogen gas).

When the gas supply source 82 supplies gas to the adsorbents, the concentrations of $CO_2$ in the adsorbents fall and $CO_2$ is desorbed from the adsorbents. By using a gas for desorbing $CO_2$ from the adsorbents, it is possible to decrease the energy required for desorbing $CO_2$ from the adsorbents, compared with heating the adsorbents or reducing the pressure around the adsorbents.

The $CO_2$ pump 83 is configured to suck out gas from the $CO_2$ desorption container 81. That is, the $CO_2$ pump 83 is configured to discharge $CO_2$ desorbed from the adsorbents to the outside of the $CO_2$ desorption container 81. When desorbing $CO_2$ from the adsorbents, gas is supplied from the gas supply source 82 to the $CO_2$ desorption container 81 and the $CO_2$ pump 83 is operated. The $CO_2$ discharged from the $CO_2$ desorption container 81 is for example stored in the $CO_2$ storage container.

Note that, the gas supply source 82 may be omitted and $CO_2$ may be desorbed from the adsorbents in the $CO_2$ desorption container 81 by heating the adsorbents by a heating device such as an electric heater or reducing the pressure in the $CO_2$ desorption container 81 by a vacuum reducing device such as a vacuum pump. Further, the $CO_2$ pump 83 may be omitted and $CO_2$ may be naturally discharged from the top part of the $CO_2$ desorption container 81. Further, in order to individually desorb $CO_2$ from the adsorbents taken out from the vehicle 1, the gas having a concentration of $CO_2$ of less than a predetermined value may be supplied to the adsorbents.

Sixth Embodiment

The vehicle and $CO_2$ recovery method according to the sixth embodiment are basically the same as the vehicle and $CO_2$ recovery method according to the first embodiment except for the points explained below. For this reason, below, the sixth embodiment according to the present invention will be explained centered about parts different from the first embodiment.

Figure 16:
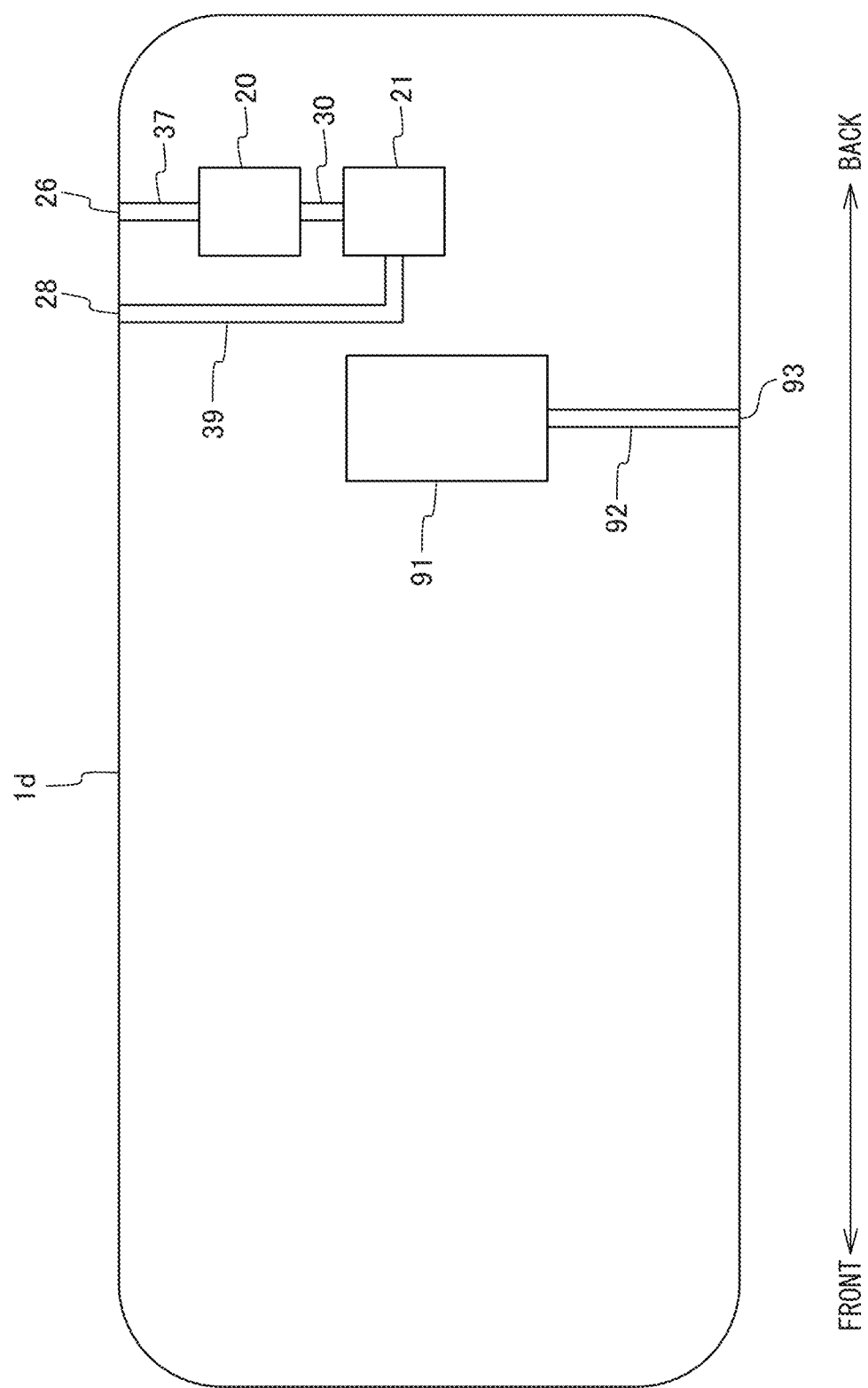
FIG. 16 is a view schematically showing a vehicle according to a sixth embodiment of the present invention.

FIG. 16 is a view schematically showing a vehicle 1d according to a sixth embodiment of the present invention. Note that, FIG. 16 shows only a part of the configuration of the vehicle 1d.

In a vehicle 1d provided with an internal combustion engine 10 (see FIG. 1), fuel is consumed for generating power for driving the vehicle 1d. For this reason, the vehicle 1d is provided with a fuel tank 91 storing fuel and a refueling path 92 supplying fuel from outside of the vehicle 1d to the fuel tank 91. The refueling path 92 is communicated with the outside of the vehicle 1d through the refueling port 93 at one end part and is communicated with the inside of the fuel tank 91 at the other end part. The refueling path 92 extends upward at a slant from the fuel tank 91 toward the refueling port 93.

Further, as explained above, in the vehicle 1d, adsorbent is supplied from the first supply port 26 through the first supply passage 37 to the $CO_2$ recovery container 20, while adsorbent is supplied from the second supply port 28 through the second supply passage 39 to the water recovery container 21. For this reason, if the refueling port 93, the first supply port 26, and the second supply port 28 are difficult to differentiate, the trouble is liable to arise of the fuel tank 91 being supplied with an adsorbent or of the $CO_2$ recovery container 20 or the water recovery container 21 being supplied with fuel.

Therefore, in the sixth embodiment, the refueling port 93 is provided at one side surface of the vehicle 1d while the first supply port 26 and the second supply port 28 are provided at the other side surface of the vehicle 1d. That is, the refueling path 92 is connected to one side surface of the vehicle 1d while the first supply passage 37 and the second supply passage 39 are connected to the other side surface of the vehicle 1d. By doing this, the refueling port 93, the first supply port 26 and the second supply port 28 become easy to differentiate and the above trouble can be kept from occurring. In the present embodiment, the refueling path 92 is connected to the left side surface of the vehicle 1d while the first supply passage 37 and the second supply passage 39 are connected to the right side surface of the vehicle 1d.

Seventh Embodiment

The vehicle and $CO_2$ recovery method according to the seventh embodiment are basically the same was the vehicle and $CO_2$ recovery method according to the sixth embodiment except for the points explained below. For this reason, below, the seventh embodiment according to the present invention will be explained centered about parts different from the sixth embodiment.

Figure 17:
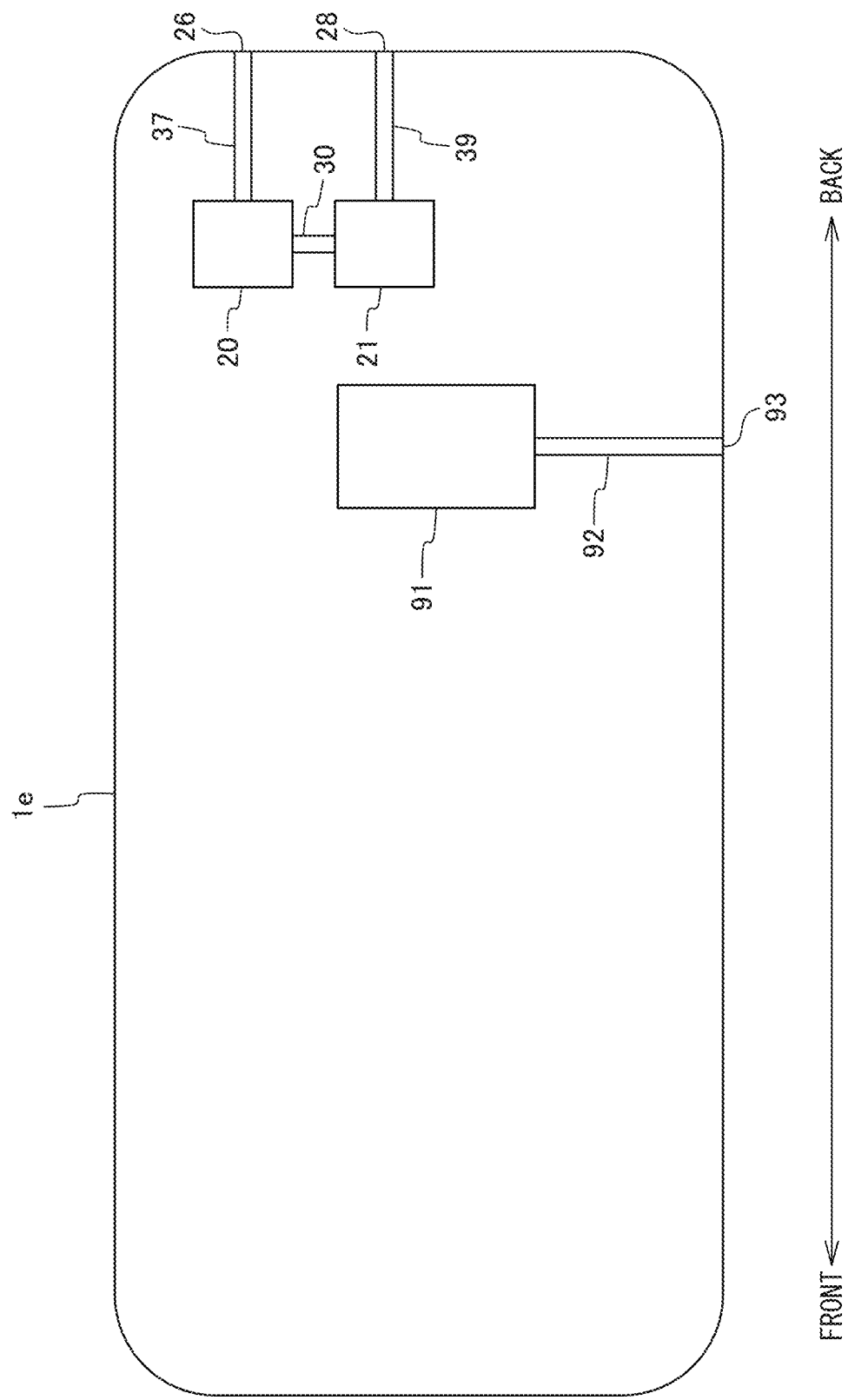
FIG. 17 is a view schematically showing a vehicle according to a seventh embodiment of the present invention.

FIG. 17 is a view schematically showing a vehicle 1e according to the seventh embodiment of the present invention. Note that, FIG. 17 shows only a part of the configuration of the vehicle 1e.

In the seventh embodiment, the refueling port 93 is provided at one side surface of the vehicle 1e while the first supply port 26 and the second supply port 28 are connected to the back part of the vehicle 1d. That is, the refueling path 92 is connected to one side surface of the vehicle 1e while the first supply passage 37 and the second supply passage 39 are connected to the back of the vehicle 1e. Due to this, the refueling port 93, the first supply port 26 and the second supply port 28 become easy to differentiate and the above trouble can be kept from occurring. In the present embodiment, the refueling path 92 is connected to the left side of the vehicle 1d.

Note that, the refueling path 92 may be connected to one side surface of the vehicle 1e, the first supply passage 37 may be connected to the other side surface of the vehicle 1e, and the second supply passage 39 may be connected to the back of the vehicle 1e. Further, the refueling path 92 may be connected to one side surface of the vehicle 1e, the second supply passage 39 may be connected to the other side surface of the vehicle 1e, and the first supply passage 37 may be connected to the back of the vehicle 1e. Due to this, it is possible to keep the trouble arising of the adsorbent which should be supplied to the $CO_2$ recovery container 20 from being supplied to the water recovery container 21 or the adsorbent which should be supplied to the water recovery container 21 from being supplied to the $CO_2$ recovery container 20.

Above, preferred embodiments according to the present invention were explained, but the present invention is not limited to these embodiments and may be corrected and changed in various ways within the language of the claims.

Further, the above-mentioned embodiments can be implemented in any combination. For example, if the third embodiment and the sixth embodiment are combined, the refueling path 92 is connected to one side surface of the vehicle 1d while the supply passage 42 is connected to the other side surface of the vehicle 1d. Further, if the third embodiment and the seventh embodiment are combined, the refueling path 92 is connected to one side surface of the vehicle 1e while the supply passage 42 is connected to the back of the vehicle 1e.

REFERENCE SIGNS LIST 1, 1a, 1b, 1c, 1d, 1e: vehicle
20, 20a, 20b, 20c: $CO_2$ recovery container

The invention claimed is:

1. A vehicle able to recover $CO_2$, comprising:
an engine;
an exhaust passage connected to the engine; and
a $CO_2$ recovery container holding an adsorbent adsorbing $CO_2$ in gas,
wherein the $CO_2$ recovery container is connected to the exhaust passage, and the $CO_2$ recovery container is configured so that the adsorbent is taken out from the vehicle.

2. The vehicle according to claim 1, further comprising a discharge passage discharging the adsorbent from the $CO_2$ recovery container to an outside of the vehicle.

3. The vehicle according to claim 2, further comprising a supply passage supplying the adsorbent from the outside of the vehicle to the $CO_2$ recovery container.

4. The vehicle according to claim 2, further comprising
an adsorbent storage container storing the adsorbent before contacting gas in the $CO_2$ recovery container, and
a supply passage supplying the adsorbent from the outside of the vehicle to the adsorbent storage container.

5. A vehicle able to recover $CO_2$, comprising
a $CO_2$ recovery container holding an adsorbent adsorbing $CO_2$ in gas,
wherein the vehicle is configured so that the adsorbent is taken out from the vehicle;
a discharge passage discharging the adsorbent from the $CO_2$ recovery container to an outside of the vehicle;

a supply passage supplying the adsorbent from the outside of the vehicle to the $CO_2$ recovery container;

a fuel tank storing fuel, and a refueling path supplying fuel from the outside of the vehicle to the fuel tank, wherein the refueling path is connected to one side surface of the vehicle, and the supply passage is connected to the other side surface of the vehicle.

6. The vehicle according to claim 3, further comprising a fuel tank storing fuel, and a refueling path supplying fuel from the outside of the vehicle to the fuel tank, wherein the refueling path is connected to a side surface of the vehicle, and the supply passage is connected to a back of the vehicle.

7. The vehicle according to claim 1, wherein at least a part of the $CO_2$ recovery container can be detached from the vehicle.

8. The vehicle according to claim 2, further comprising an adsorbent storage container storing the adsorbent before contact with gas in the $CO_2$ recovery container, wherein at least a part of the adsorbent storage container being detachable from the vehicle.

9. The vehicle according to claim 1, further comprising a water recovery container holding an adsorbent adsorbing water vapor in the gas, wherein the vehicle is configured so that the adsorbent adsorbing $CO_2$ in the gas and the adsorbent adsorbing water vapor in the gas are taken out from the vehicle.

10. The vehicle according to claim 1, wherein the $CO_2$ recovery container comprises:

a first inlet port configured to receive the gas from the exhaust passage; and a second inlet port configured to receive the adsorbent.

11. The vehicle according to claim 1, wherein the $CO_2$ recovery container comprises:

a first outlet port configured to permit the gas to exit the vehicle; and a second outlet port configured to permit the adsorbent to be taken out from the vehicle.

12. The vehicle according to claim 1, wherein the $CO_2$ recovery container comprises:

an open and close mechanism, wherein, in a closed state, the open and close mechanism is configured to hold the adsorbent in the $CO_2$ recovery container, and, in an open state, the open and close mechanism is configured to allow the adsorbent to be taken out from the vehicle.

13. The vehicle according to claim 1, wherein the adsorbent is configured to be taken out from the vehicle due to gravity.

* * * * *